(12) United States Patent
Reu

(10) Patent No.: US 12,483,076 B2
(45) Date of Patent: Nov. 25, 2025

(54) STATOR FOR MOTOR

(71) Applicant: LG Electronics Inc., Seoul (KR)

(72) Inventor: Jinwook Reu, Seoul (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 18/473,771

(22) Filed: Sep. 25, 2023

(65) Prior Publication Data

US 2024/0186842 A1    Jun. 6, 2024

(30) Foreign Application Priority Data

Dec. 6, 2022 (KR) .......................... 10-2022-0168917

(51) Int. Cl.
    *H02K 1/14*     (2006.01)
    *H02K 3/28*     (2006.01)
    *H02K 3/32*     (2006.01)

(52) U.S. Cl.
    CPC ............... *H02K 1/141* (2013.01); *H02K 3/28* (2013.01); *H02K 3/325* (2013.01)

(58) Field of Classification Search
    CPC .......... H02K 1/141; H02K 3/28; H02K 3/325; H02K 2203/06; H02K 3/52; H02K 2213/03; H02K 1/14; H02K 3/50; H02K 1/148; H02K 3/521; H02K 2203/12
    USPC .................................................... 310/216.23
    See application file for complete search history.

(56) References Cited

U.S. PATENT DOCUMENTS

| | | | |
|---|---|---|---|
| 7,821,175 B2 | 10/2010 | Ionel et al. | |
| 2014/0339947 A1* | 11/2014 | Wen | H02K 1/148 310/194 |
| 2015/0076943 A1* | 3/2015 | Hamajima | H02K 3/522 310/71 |
| 2018/0226864 A1* | 8/2018 | Kim | H02K 16/04 |
| 2019/0319506 A1* | 10/2019 | Reu | H02K 1/146 |
| 2024/0186842 A1* | 6/2024 | Reu | H02K 3/52 |

FOREIGN PATENT DOCUMENTS

| | | |
|---|---|---|
| FR | 2347810 | 11/1977 |
| KR | 10-2019980018909 | 7/1998 |
| KR | 10-1146440 | 5/2012 |

* cited by examiner

*Primary Examiner* — Ahmed Elnakib
(74) *Attorney, Agent, or Firm* — Fish & Richardson P.C.

(57) ABSTRACT

A stator of a motor include a first split core including first teeth, a second split core including second teeth and facing the first split core to define a rotor accommodating hole with the first split core, a first insulator disposed at the first split core, a second insulator disposed at the second split core, phase coils that are wound around the first teeth and the second teeth, respectively, and are configured to connect to a three-phase alternating current (AC) power supply, power line connectors that are disposed at the first insulator and configured to connect the phase coils to the three-phase AC power supply, and a neutral line connector that is disposed at the second insulator and connected to the phase coils.

20 Claims, 16 Drawing Sheets

STATOR FOR MOTOR

CROSS-REFERENCE TO RELATED APPLICATION

Pursuant to 35 U.S.C. § 119(a), this application claims the benefit of the earlier filing date and the right of priority to Korean Patent Application No. 10-2022-0168917, filed on Dec. 6, 2022, the contents of which are incorporated by reference herein in their entirety.

TECHNICAL FIELD

The present disclosure relates to a stator of a motor.

BACKGROUND

A motor is a device that converts electrical energy into mechanical energy. In some examples, the motor includes a stator and a rotor rotatable relative to the stator.

The stator may include a stator core, a stator coil wound around the stator core, and an insulator for insulation between the stator core and the stator coil. In some case, the stator core is formed by stacking a plurality of electrical steel sheets (magnetic steel sheets, silicon steel sheets) in an insulating manner. The stator core may include a plurality of teeth and a plurality of slots. For example, the plurality of teeth and the plurality of slots are alternately disposed along a circumferential direction.

In some cases, the stator coil may include a plurality of coil portions wound around peripheries of the plurality of teeth. The plurality of coil portions are wound using wiring components (e.g., printed circuit boards (PCBs) for wiring, bus bars, etc.). In some cases, the plurality of coil portions are wound using the wiring components, which may cause an increase in a manufacturing cost.

In some cases, where a structure for wiring the plurality of coil portions becomes complicated, a separate component (e.g., a tube) may be used for insulation between wires, which may cause an increase of time and efforts for wiring the stator coil.

In some cases, a separate conductor (or PCB) may connect the divided coils of the teeth, where a soldering operation may be performed to electrically connect the conductor and the coils, which may cause an increase of time and auxiliary works (e.g., soldering).

SUMMARY

The present disclosure describes a stator or a motor capable of facilitating wiring of a stator coil.

The present disclosure further describes a stator of a motor capable of suppressing an input of a material of a stator core.

The present disclosure further describes a stator of a motor capable of suppressing a use of a component for wiring (or connecting) a stator coil.

The present disclosure further describes a stator of a motor capable of suppressing a generation of a gap and/or vibration between wires of a stator coil.

The present disclosure further describes a stator of a motor capable of stably maintaining an insulation distance between phases of wires of a stator coil.

In some implementations, a stator of a motor according to the present disclosure is characterized in that each insulator of a first split core and a second split core which are split from each other includes power line connectors and a neutral line connector.

More specifically, one of a first insulator disposed on the first split core and a second insulator disposed on the second split core includes the power line connectors, and another one includes the neutral line connector, to facilitate wiring of phase coils of the first split core and phase coils of the second split core.

In some examples, the stator of the motor includes a connection member that is formed of an insulating member and connects the first insulator and the second insulator, so as to stably maintain an initial coupling state between the first split core and the second split core.

Accordingly, the stator can stably maintain a uniform air gap with a rotor.

According to one aspect of the subject matter described in this application, a stator of a motor includes a first split core including a plurality of first teeth, a second split core including a plurality of second teeth, the second split core facing the first split core and defining a rotor accommodating hole with the first split core, a first insulator disposed at the first split core, a second insulator disposed at the second split core, a plurality of phase coils that are wound around the plurality of first teeth and the plurality of second teeth, respectively, the plurality of phase coils being configured to connect to a three-phase alternating current (AC) power supply, a plurality of power line connectors that are disposed at the first insulator and configured to connect the plurality of phase coils to the three-phase AC power supply, and a neutral line connector that is disposed at the second insulator and connected to the plurality of phase coils.

Implementations according to this aspect can include one or more of the following features. For example, the plurality of power line connectors can be disposed at one side of the plurality of first teeth and face the plurality of first teeth in an axial direction of the stator, respectively. The plurality of phase coils can include (i) first phase coils that are wound around the plurality of first teeth and (ii) second phase coils that are wound around the plurality of second teeth. The stator can include a plurality of phase coil connectors that are disposed at a side of the plurality of power line connectors, where the plurality of phase coil connectors connect the first phase coils and the second phase coils electrically in series, respectively.

In some examples, the first phase coils can be arranged in a phase order defined along a circumferential direction of the rotor accommodating hole, and the second phase coils are arranged in the phase order along the circumferential direction. In some examples, the first insulator can include a first wire guide configured to guide the plurality of phase coils, and the second insulator can include a second wire guide configured to guide the plurality of phase coils.

In some implementations, the first wire guide can be spaced apart from the first split core in the axial direction, and the second wire guide can be spaced apart from the second split core in the axial direction, where the plurality of power line connectors protrude from the first wire guide in the axial direction, and the neutral line connector protrudes from the second wire guide in the axial direction. In some examples, each of the first wire guide and the second wire guide can define wire grooves that accommodate the plurality of phase coils, respectively, and separate the plurality of phase coils from one another. In some examples, the wire grooves can be spaced apart from one another by a preset distance in the axial direction. In some examples, a width of one of the wire grooves can be 1.1 times or more of a wire diameter of one of the plurality of phase coils.

In some implementations, each of the plurality of power line connectors can include a terminal configured to connect to the three-phase AC power supply, a terminal accommodating part that protrudes from the first wire guide and accommodates the terminal, and a first slot that accommodates one or more of the plurality of phase coils. In some examples, each of the plurality of phase coil connectors can include a conductor, a conductor accommodating part that protrudes from the first wire guide and accommodates the conductor, and a second slot that accommodates one or more of the plurality of phase coils.

In some examples, the first slot can be defined between inner surfaces of each of the plurality of power line connectors, and the second slot can be defined between inner surfaces of each of the plurality of phase coil connectors. For instance, the first slot and the second slot can be cut portions recessed by preset lengths in the axial direction.

In some examples, each of the wire grooves can have (i) an outer section that is recessed inward from an outer surface of a corresponding wire guide among the first wire guide and the second wire guide, and (ii) a side section that laterally extends from the outer section to a side surface of the corresponding wire guide.

In some implementations, the neutral line connector can include a conductor, a conductor accommodating part that protrudes from the second wire guide in the axial direction and accommodates the conductor, and a slot that accommodates one of the plurality of phase coils.

In some implementations, the first split core can include a first yoke, where and the plurality of first teeth are three teeth that protrude from the first yoke and extend parallel to one another. The second split core can include a second yoke, and the plurality of second teeth are three teeth that protrude from the second yoke and extend parallel to one another.

In some implementations, the stator can include connection members that are made of an insulating material and connect the first split core and the second split core to each other. For example, each of the connection members can include a body that faces side surfaces of the first split core and the second split core, a first coupling part disposed at a first end portion of the body and coupled to the first split core along the axial direction, and a second coupling part disposed at a second end portion of the body and coupled to the second split core along the axial direction.

In some examples, the first coupling part can include a first protrusion that protrudes from the body and is inserted into the first split core, and a first bent end portion that is curved from an end of the first protrusion. The second coupling part can include a second protrusion that protrudes from the body and is inserted into the second split core, and a second bent end portion that is curved from an end of the second protrusion.

In some implementations, each of the connection members can include a spacer that is disposed between the first split core and the second split core and configured to maintain a distance between the first split core and the second split core. In some implementations, each of the connection members can include a connection wire guide configured to guide the plurality of phase coils, where the connection wire guide defines a plurality of connection wire grooves that separately accommodate the plurality of phase coils and extend parallel to the wire grooves of the first insulator and the second insulator.

This can facilitate wiring of the plurality of phase coils (stator coil).

Specifically, a Y-connection of the three-phase concentrated winding of the plurality of phase coils can be easily performed.

In some examples, a material amount to manufacture the stator core can be reduced.

In some implementations, the power line connectors are disposed on the first insulator, and each disposed to correspond to one side of each of the plurality of teeth along an axial direction.

Here, the neutral wire connector is disposed on the second insulator.

According to this configuration, the plurality of phase coils and lead wires can be easily connected.

In some examples, wiring (Y-connection) of the plurality of phase coils can be easily performed.

In some implementations, phase coil connectors are disposed on one side of the power line connectors to connect in series the phase coils of the first split core and the phase coils of the second split core.

This can facilitate the serial connection between the phase coils of the first split core and the phase coils of the second split core.

In some implementations, the plurality of phase coils of the first split core and the plurality of phase coils of the second split core are spaced apart in the same order along a circumferential direction of the rotor accommodating hole.

Here, the plurality of teeth of each of the first split core and the second split core can be three.

The plurality of phase coils include three phase coils concentratively wound around the three teeth of the first split core, and three phase coils concentratively wound around the three teeth of the second split core.

The three phase coils of the first split core are respectively connected to U-phase, V-phase, and W-phase of the three-phase AC power supply in a first direction of a circumferential direction, and the three phase coils of the second split core are connected to U-phase, V-phase, and W-phase in the first direction.

In some implementations, the first insulator and the second insulator include wire guides, respectively, to guide wires of the plurality of phase coils.

Accordingly, the wires of the plurality of phase coils can be easily wound without interference.

In some implementations, the wire guides extend outwardly along the axial direction from the first split core and the second split core, respectively.

The power line connectors and the neutral line connector protrude from the wire guides in the axial direction.

This configuration can facilitate the connection of the plurality of phase coils.

In some implementations, the wire guide includes wire grooves in which the wires of the plurality of phase coils are separately accommodated for each phase.

The wire grooves are three for separately accommodating the wires of the plurality of phase coils for each phase (U-phase, V-phase, and W-phase).

In some implementations, the wire grooves are spaced apart from one another by a preset distance in the axial direction.

This can suppress an occurrence of an electric discharge between the wires of the plurality of phase coils.

In some implementations, the wire grooves are formed to be 1.1 times or more of wire diameters of the wires of the plurality of phase coils.

This can allow a common use of the insulator even when the wires of the plurality of phase coils have different wire diameters.

According to this configuration, manufacturing of the insulator can be facilitated.

In some implementations, each of the power line connectors includes: a terminal connected to the three-phase AC power supply; a terminal accommodating part in which the terminal is accommodated; and a slot in which the wire of the phase coil is accommodated.

This configuration can facilitate the connection of the plurality of phase coils.

In some implementations, each of the phase coil connectors includes: a conductor; a conductor accommodating part in which the conductor is accommodated; and a slot in which the wire of the phase coil is accommodated.

This configuration can facilitate a connection task of the plurality of phase coils.

In some implementations, the slot of the power line connector and the slot of the phase coil connector are disposed on inner surfaces of the power line connector and the phase coil connector.

Accordingly, a connection length (path) of the wires of the plurality of phase coils can be shortened.

In some implementations, the slot of the power line connector and the slot of the phase coil connector are cut by preset lengths in the axial direction.

This configuration can facilitate the connection of the plurality of phase coils.

In some implementations, each of the wire grooves includes an outer section recessed into an outer surface of the wire guide of each of the first and second insulators.

The wire groove further includes a side section extending from the outer section of the wire guide to a side surface of the wire guide.

Accordingly, a generation of clearance between the wires of the plurality of phase coils can be suppressed, and an occurrence of vibration and/or damage due to the clearance between the wires can be suppressed.

In some implementations, the neutral wire connector includes: a conductor; a conductor accommodating part in which the conductor is accommodated; and a slot in which the wire of the phase coil is separately accommodated.

Accordingly, the neutral wire connection (wiring) of the plurality of phase coils can be easily performed.

In some implementations, each of the first split core and the second split core has an "E" shape having a yoke and three teeth protruding parallel to one another from the yoke.

Here, the teeth of the first split core and the second split core are disposed to face each other, and each tooth has an inner surface disposed on the same circumference.

In some implementations, the stator of the motor can further include connection members formed of an insulating member and connecting the first split core and the second split core.

Thus, the first split core and the second split core can be firmly coupled.

According to this configuration, since an initial coupling state between the first split core and the second split core is stably achieved, an air gap between the first split core and the second split core and the rotor can be stably maintained during operation.

In some implementations, each of the connection members include: a body disposed on a side surface of each of the first split core and the second split core; a first coupling part disposed on one end portion of the body and coupled to the first split core; and a second coupling part disposed on another end portion of the body and coupled to the second split core, and the first coupling part and the second coupling part are formed such that the connection member is coupled to the first split core and the second split core along the axial direction.

This can suppress a generation of lateral clearance among the first split core, the second split core, and the connection member.

In some implementations, the first coupling part and the second coupling part include: protrusions protruding from the body and inserted into the first split core and the second split core, respectively; and bent end portions bent from the protrusions, respectively.

Accordingly, the approach and separation between the first split core and the second split core can be suppressed, and the approach and separation of the connection member to and from the first split core and the second split core can be suppressed, thereby allowing the first split core, the second split core, and the connection member to be firmly coupled.

In some implementations, the connection member further includes a spacer inserted between the first split core and the second split core to maintain a distance between the first split core and the second split core.

This can suppress the first split core and the second split core from being close to each other, thereby preventing an occurrence of leakage of magnetic flux.

In some implementations, the connection member includes wire guides to guide the wires of the plurality of phase coils.

This can suppress an occurrence of interference between the wires of the plurality of phase coils.

In some implementations, the wire guide of the connection member includes a plurality of wire grooves in which the wires of the plurality of phase coils are separately accommodated, and the plurality of wire grooves of the connection member are aligned to correspond to the wire grooves of the first insulator and the second insulator.

Since the wires of the plurality of phase coils are separately accommodated, partial electric discharge between the wires can be suppressed.

In some implementations, one of the first insulator and the second insulator is provided with the power line connectors for connecting the plurality of phase coils and the three-phase AC power supply, and another one is provided with the neutral line connector for simultaneously connecting the plurality of phase coils, which can facilitate the connection of the plurality of phase coils.

In some examples, a material amount to manufacture the stator core can be reduced.

In some examples, since the power line connectors are disposed to correspond to the plurality of teeth on one side of the teeth, which can facilitate the connection between the plurality of phase coils and the three-phase AC power supply.

In some examples, the phase coil connectors for connecting in series the phase coils of the first split core and the phase coils of the second split core are provided on one side of the power line connectors, which can facilitate the serial connection of the plurality of phase coils.

Also, the plurality of phase coils of the first split core and the plurality of phase coils of the second split core are disposed at a spacing manner in the same order along the circumferential direction of the rotor accommodating hole, which can facilitate the connection of the plurality of phase coils.

In some examples, since the wire guides for guiding the wires of the plurality of phase coils are disposed in the first insulator and the second insulator, respectively, interference between the wires of the plurality of phase coils can be suppressed.

In some examples, the wire guides extend outward from the first split core and the second split core along the axial direction, respectively, and the power line connectors and the neutral line connector protrude from the wire guides along the axial direction, respectively. As a result, interference between the wires of the plurality of phase coils can be suppressed, and wiring can be easily performed.

In some examples, the wire guide has wire grooves formed to accommodate the wires of the plurality of phase coils separately for each phase, so that the wires of the plurality of phase coils can be accommodated separately from each other.

In some examples, since the wire grooves are formed to be spaced apart by a preset distance along the axial direction, an occurrence of electric discharge between the wires of the plurality of phase coils can be suppressed.

In some examples, since the wire groove is formed to be 1.1 times or more of the wire diameters of the wires of the plurality of phase coils, the insulator can be commonly used even when the wire diameters of the wires of the plurality of phase coils are different, making it easy to manufacture the insulator.

Since the slots of the power line connector and the slots of the phase coil connector are formed to be cut by preset lengths along the axial direction, the wires of the plurality of phase coils can be easily connected.

In some examples, the wire grooves have the outer section extending in the circumferential direction on the outer surfaces of the first insulator and the second insulator, and the side section extending to the side surfaces of the power line connectors and the phase coil connectors. This can suppress a generation of clearance between the wires of the plurality of phase coils, and an occurrence of vibration and/or damage due to the clearance between the wires.

In some examples, the connection member connecting the first split core and the second split core can make the first split core and the second split core firmly coupled.

In some examples, the connection member further includes the spacer inserted between the first split core and the second split core to maintain the distance between the first split core and the second split core, so that the first split core and the second split core are prevented from being close to each other, thereby suppressing leakage of magnetic flux.

In some examples, since the connection member includes the wire guides for guiding the wires of the plurality of phase coils, the wiring of the plurality of phase coils can be easily performed.

DETAILED DESCRIPTION

Figure 1:
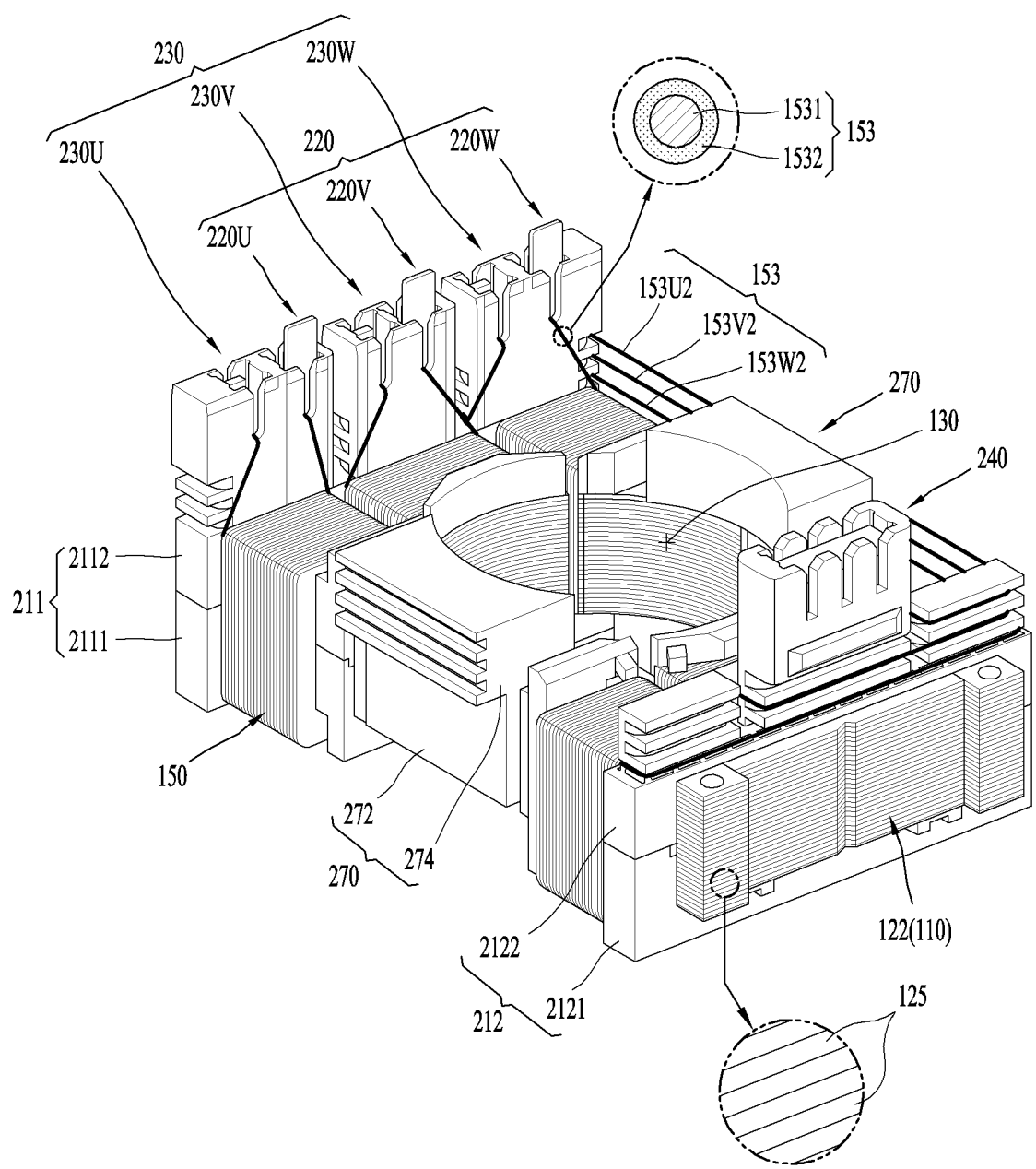
FIG. 1 is a perspective view illustrating an example of a stator of a motor.

Hereinafter, one or more implementations of the present disclosure will be described in detail with reference to the accompanying drawings. For the sake of brief description with reference to the drawings, the same or equivalent components will be provided with the same reference numerals, and description thereof will not be repeated.

Figure 2:
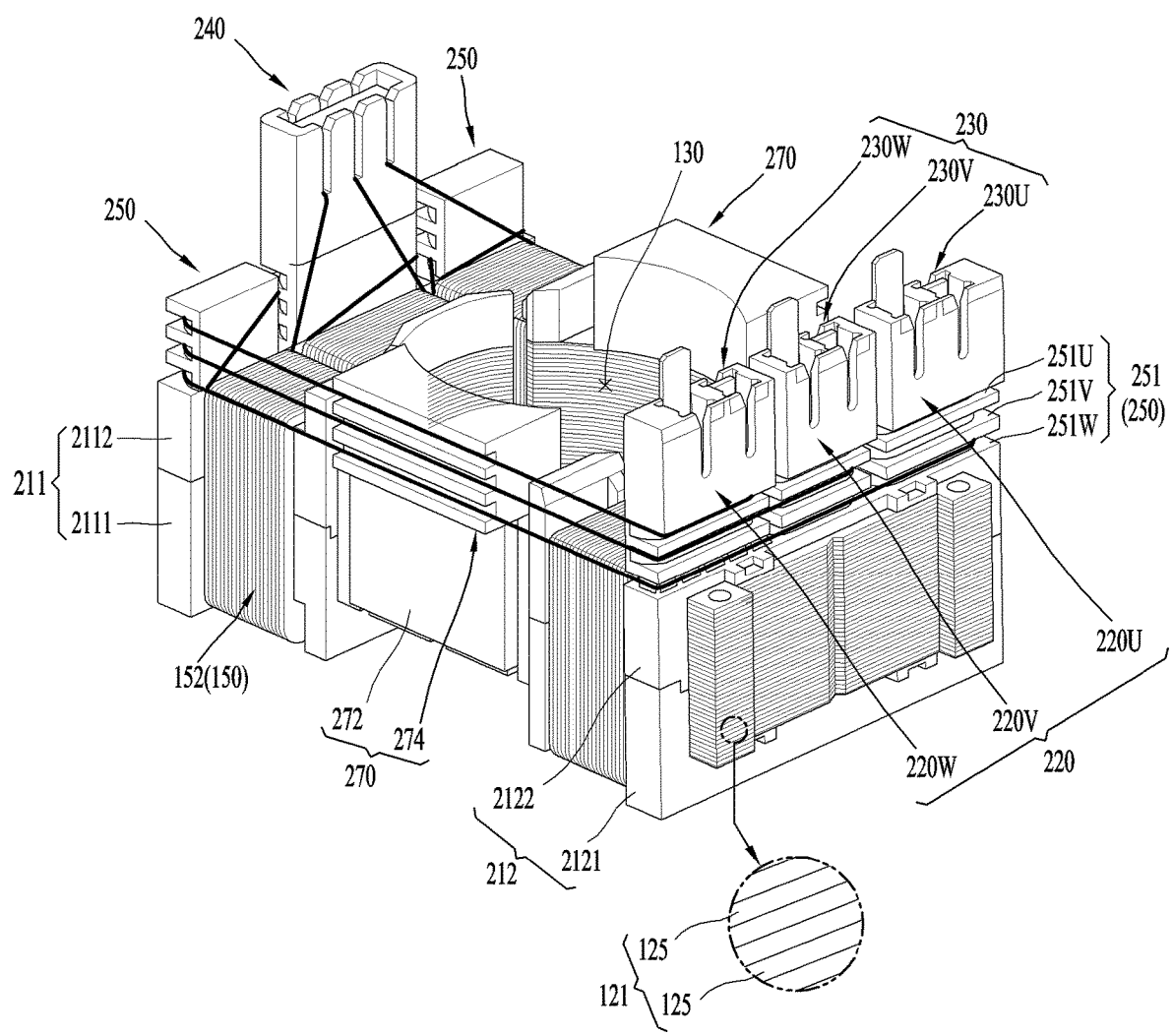
FIG. 2 is a perspective view illustrating the stator of the motor of FIG. 1, viewed from a different direction.
Figure 3:
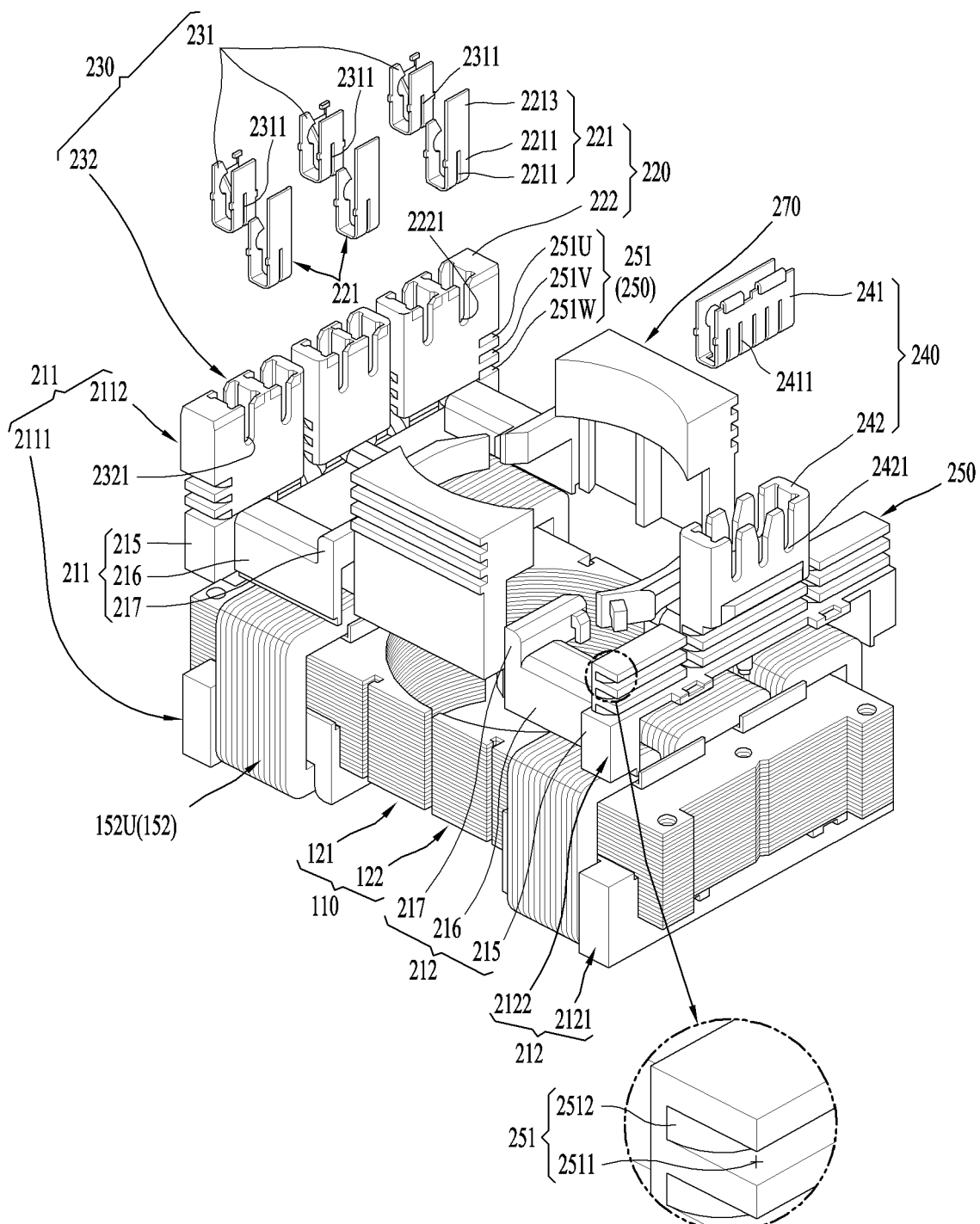
FIG. 3 is a planar view illustrating an example of a first split core and a second split core of FIG. 1.
Figure 4:
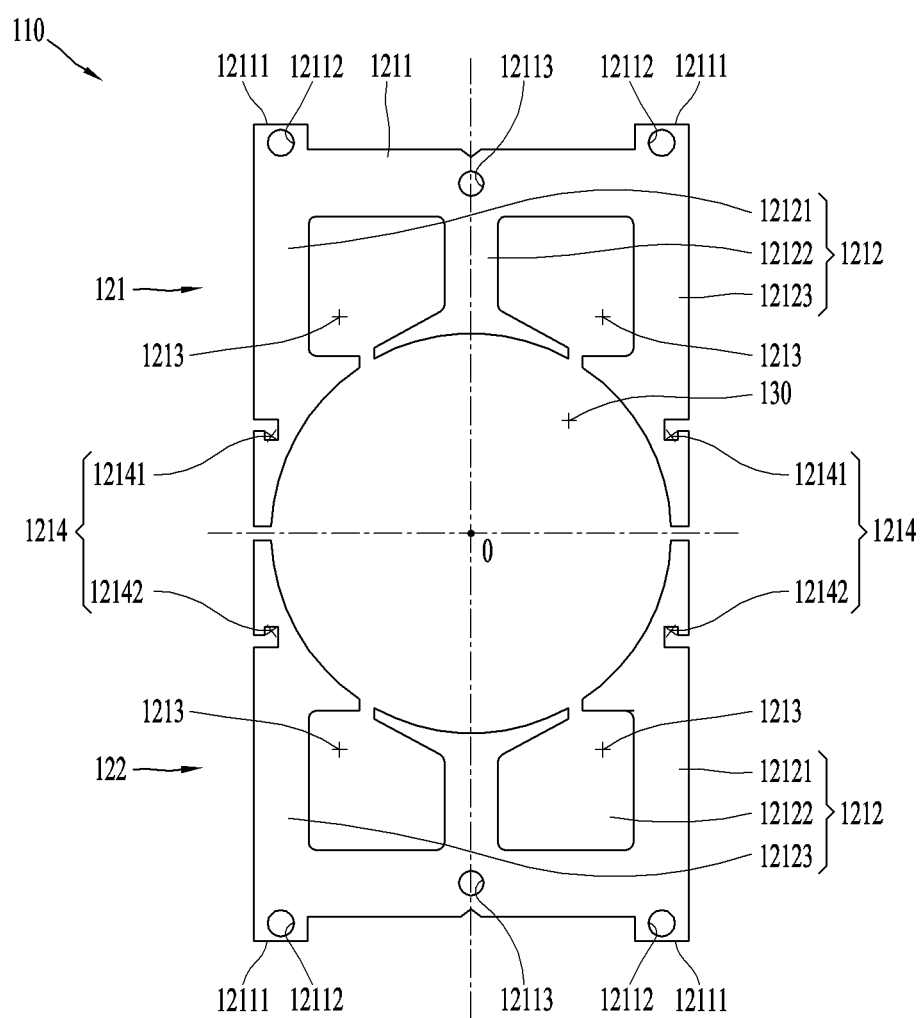
FIG. 4 is a detached perspective view illustrating the stator of the motor of FIG. 1.

FIG. 1 is a perspective view illustrating an example of a stator of a motor, FIG. 2 is a perspective view illustrating the stator of the motor of FIG. 1, viewed from a different direction, FIG. 3 is a planar view illustrating a first split core and a second split core of FIG. 1, and FIG. 4 is a detached perspective view illustrating the stator of the motor of FIG. 1.

In some implementations, as illustrated in FIGS. 1 to 4, a stator of a motor can include a first split core 121, a second split core 122, a first insulator 211, a second insulator 212, and a plurality of phase coils 152.

For example, the stator includes a stator core 110 and a stator coil 150 wound around the stator core 110. The stator core 110 includes the first split core 121 and the second split core 122. The stator coil 150 includes the plurality of phase coils 152. In some examples, the first split core 121 and the second split core 122 have the same structure.

In some implementations, the first split core 121 and the second split core 122 each include, for example, a yoke 1211 and a plurality of teeth 1212 protruding from the yoke 1211.

The first split core 121 and the second split core 122 are formed by, for example, stacking a plurality of electrical steel sheets in an insulating manner. The plurality of electrical steel sheets each include the yoke 1211 and the plurality of teeth 1212. The plurality of teeth 1212 can be spaced apart from one another by preset distances along a longitudinal direction of the yoke 1211. Slots 1213 can be defined between the plurality of teeth 1212, respectively.

In some implementations, the plurality of teeth 1212 are three and the slots 1213 are two. For example, the first split core 121 and the second split core 122 are formed in a substantially "E" shape. In some examples, the first split core 121 and the second split core 122 each include a first tooth 12121, a second tooth 12122, and a third tooth 12123.

In some implementations, the first split core 121 and the second split core 122 have the same shape, and a rotor accommodating hole 130 is defined between the first split core 121 and the second split core 122. For example, the first split core 121 and the second split core 122 can be disposed rotationally symmetrical with respect to a center O of the rotor accommodating hole 130. Specifically, the first tooth 12121 of the first split core 121 is rotationally symmetrical with the first tooth 12121 of the second split core 122 with respect to the center O of the rotor accommodating hole 130.

End portions of the plurality of teeth 1212 of the first split core 121 and the second split core 122 are disposed on the same circumference. In some examples, shoes extend from the end portions of the plurality of teeth 1212, respectively. For example, outer surfaces of the shoes of the first tooth 12121 and the third tooth 12123 are disposed on the same line as outer surfaces of the first tooth 12121 and the third tooth 12123, and inner surfaces of the shoes of the first tooth 12121 and the third tooth 12123 extend perpendicular to inner surfaces of the first tooth 12121 and the third tooth 12123. Arcuate inner surfaces are formed at end portions of the first tooth 12121 and the third tooth 12123, respectively.

In some examples, the second tooth 12122 has a shoe extending to both sides in a circumferential direction. An end surface of the shoe of the second tooth 12122 forms an arcuate inner surface. Here, the inner surfaces of the first tooth 12121, the second tooth 12122, and the third tooth 12123 are disposed on the same circumference.

The first split core 121 and the second split core 122 are disposed such that inner surfaces of the plurality of teeth 1212 are located on the same circumference. Accordingly, the rotor accommodating hole 130 in which a rotor is rotatably accommodated is formed inside the first split core 121 and the second split core 122. The first split core 121 and the second split core 122 each include coupling grooves 1214 to which connection members 270 to be described later are coupled.

In some implementations, guide pin holes 12113, into which guide pins 2151 of the first insulator 211 and the second insulator 212 are to be inserted, are formed in the first split core 121 and the second split core 122, respectively.

The guide pin hole 12113 is formed axially through a central area of the yoke 1211 along a longitudinal direction of the yoke 1211, for example.

The first split core 121 and the second split core 122 each include fastening portions 12111 protruding in a widthwise direction of the yoke 1211, for example.

The fastening portions 12111 can be formed to protrude outward from both end portions of the yoke 1211 in the longitudinal direction.

Fastening member insertion holes 12112 can be formed through the fastening portions 12111, respectively, so that fastening members can be inserted therein. The fastening member insertion holes 12112, for example, can be formed through the fastening portions 12111 in the axial direction.

In some examples, the plurality of phase coils 152 are wound around the plurality of teeth 1212. For example, the plurality of phase coils 152 can be implemented as a concentrated winding coil. The plurality of phase coils 152 can be concentratively wound around the plurality of teeth 1212.

The first split core 121 can be provided with the first insulator 211. The first insulator 211 is formed of an insulating material. Accordingly, the first split core 121 can be insulated from the plurality of phase coils 152.

The second split core 122 can be provided with the second insulator 212. The second insulator 212 can be formed of an insulating material. Accordingly, the second split core 122 can be insulated from the plurality of phase coils 152.

In some implementations, the first insulator 211 can have two parts to be coupled in an axial direction. Here, the axial direction indicates a direction parallel to a rotating shaft of the rotor. For example, in FIG. 1, the axial direction is indicated as a vertical (up and down) direction.

The first insulator 211, for example, includes a first lower insulator 2111 disposed on a lower side of the first split core 121, and a first upper insulator 2112 disposed on an upper side of the first split core 121.

The second insulator 212 can have two parts to be coupled in the axial direction, for example.

The second insulator 212 includes, for example, a second lower insulator 2121 disposed on a lower side of the second split core 122, and a second upper insulator 2122 disposed on an upper side of the second split core 122.

The first insulator 211 and the second insulator 212 each include, for example, a yoke insulating part 215 that surrounds and insulates the yoke 1211 of the first split core 121 and the second split core 122, and a plurality of tooth insulating parts 216 that surround and insulate the teeth 1212.

A separation preventing part 217 that prevents the separation of the phase coil 152 wound around each tooth 1212 is formed on each tooth insulating part 216 of the first insulator 211 and the second insulator 212.

The separation preventing parts 217 are formed to protrude to both sides (upper and lower sides in the drawing), respectively, along the axial direction, for example.

The first insulator 211 and the second insulator 212 are provided with guide pins 2151 inserted into the guide pin holes 12113 of the first split core 121 and the second split core 122, respectively.

Accordingly, the first insulator 211 and the second insulator 212 can be easily coupled to the first split core 121 and the second split core 122.

Here, partial areas (for example, the fastening portions 12111) of the first split core 121 and the second split core 122 extend to the outside of the first insulator 211 and the second insulator 212.

Accordingly, the first split core 121 and the second split core 122 can be fixed (coupled) to a fixture.

The first split core 121 and the second split core 122 are disposed to face each other such that inner surfaces of the plurality of teeth 1212 are located on the same circumference.

In some implementations, end regions of the first teeth 12121 and the third teeth 12123 of each of the first split core 121 and the second split core 122 are exposed to the outside of the first insulator 211 and the second insulator 212.

The connection members 270 are coupled to the exposed regions of the first split core 121 and the second split core 122.

The connection member 270 is formed of an insulating material.

Accordingly, an initial disposition of the first split core 121 and the second split core 122 can be stably maintained.

Since a clearance between the first split core 121 and the second split core 122 is suppressed by the connection member 270, the plurality of teeth 1212 can be stably maintained on the same circumference.

Accordingly, an air gap between the stator and the rotor can be maintained uniformly.

In some examples, the stator coil 150 is configured to be connected to a three-phase AC power supply.

The stator coil 150 includes a plurality of phase coils 152 wound around the plurality of teeth 1212 of the first split core 121 and the plurality of teeth 1212 of the second split core 122, respectively.

The plurality of phase coils 152 are formed by winding wires 153 having a preset wire diameter. As is well known, the wire 153 includes a copper conductor (copper wire) 1531 and a coating film (e.g., enamel) 1532 enclosing an outer surface of the conductor 1531.

Figure 5:
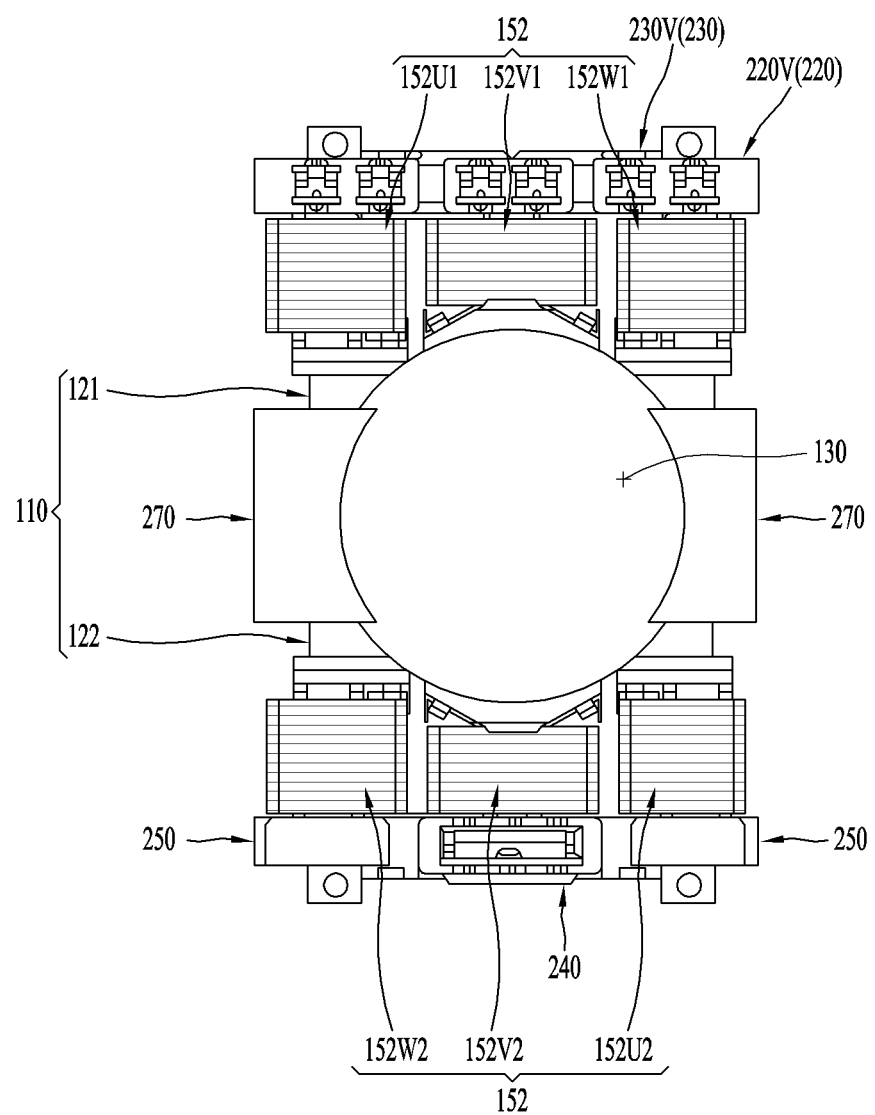
FIG. 5 is a planar view illustrating the stator of the motor of FIG. 1.
Figure 6:
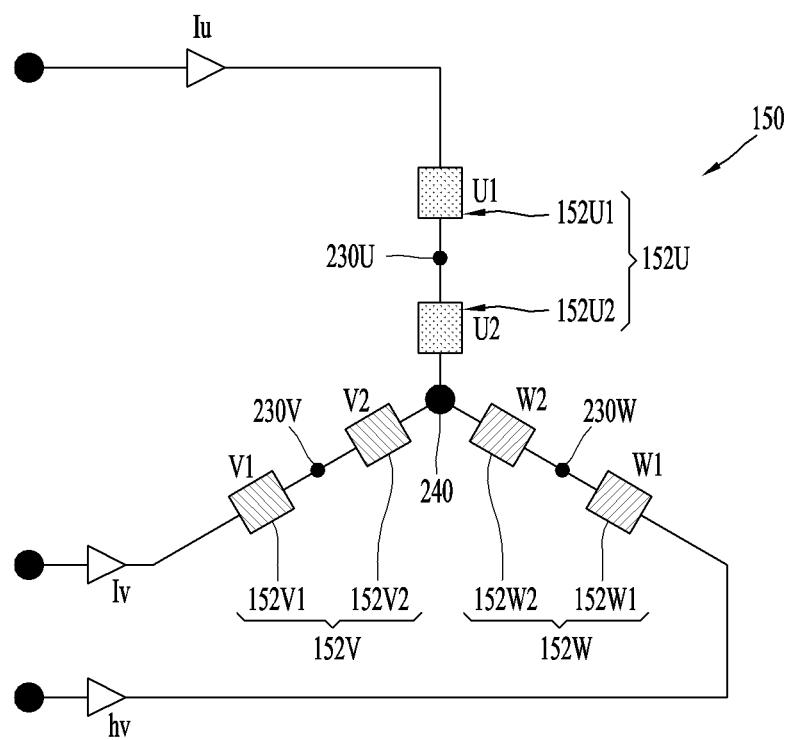
FIG. 6 is a view illustrating an example wiring of a plurality of phase coils of the stator of the motor of FIG. 1.

FIG. 5 is a planar view illustrating the stator of the motor of FIG. 1, and FIG. 6 is a view illustrating wiring of the plurality of phase coils of the stator of the motor of FIG. 1. As illustrated in FIG. 5, the plurality of phase coils 152 can include a U-phase coil 152U, a V-phase coil 152V, and a W-phase coil 152W connected to phases (U-phase, V-phase, W-phase) of the three-phase AC power supply, respectively.

The U-phase coil 152U includes, for example, a first U-phase coil 152U1 disposed in the first split core 121, and a second U-phase coil 152U2 provided in the second split core 122.

The V-phase coil 152V includes, for example, a first V-phase coil 152V1 disposed in the first split core 121, and a second V-phase coil 152V2 disposed in the second split core 122.

The W-phase coil 152W includes, for example, a first W-phase coil 152W1 disposed in the first split core 121, and a second W-phase coil 152W2 disposed in the second split core 122.

In some implementations, the plurality of phase coils 152 can be arranged in the same order in one direction (e.g., the clockwise direction in the drawing) along the circumferential direction of the rotor accommodating hole 130.

For example, the first U-phase coil 152U1 is disposed around the first tooth 12121 of the first split core 121. The first V-phase coil 152V1 is disposed around the second tooth 12122 of the first split core 121. The first W-phase coil 152W1 is disposed around the third tooth 12123 of the first split core 121. The second U-phase coil 152U2 is disposed around the first tooth 12121 of the second split core 122. The second V-phase coil 152V2 is disposed around the second tooth 12122 of the second split core 122. The second W-phase coil 152W2 is disposed around the third tooth 12123 of the second split core 122.

As illustrated in FIG. 6, In some implementations, the plurality of phase coils 152 disposed in the first split core 121 and the plurality of phase coils 152 disposed in the second split core 122 are connected in series for each phase.

Specifically, the first U-phase coil 152U1 and the second U-phase coil 152U2 are connected in series.

The first V-phase coil 152V1 and the second V-phase coil 152V2 are connected in series.

The first W-phase coil 152W1 and the second W-phase coil 152W2 are connected in series.

The plurality of phase coils 152 can have a Y-connection.

The first U-phase coil 152U1, the first V-phase coil 152V1, and the first W-phase coil 152W1 are connected to respective phase power of the three-phase AC power supply.

The second U-phase coil 152U2, the second V-phase coil 152V2, and the second W-phase coil 152W2 are electrically connected to a neutral line COMMON (neutral line connector 240).

Referring back to FIGS. 1 to 4, the first insulator 211 and the second insulator 212 each include a wire guide 250 guiding the wires 153 of the plurality of phase coils 152.

The wire guide 250 protrudes to both sides (upper and lower sides) along the axial direction to prevent the plurality of phase coils 152 from being separated outward.

Accordingly, the phase coil 152 wound around each tooth 1212 can be prevented from being separated away from the rotor accommodating hole 130.

In some implementations, the wire guide 250 guides each wire 153 of the plurality of phase coils 152 not to interfere or be in unnecessary contact with each other. In some examples, the wire guide 250 includes a plurality of wire grooves 251 formed to separately accommodate the wires 153 of the plurality of phase coils 152 for each phase. In some implementations, the plurality of wire grooves 251 are formed in the wire guide 250 on one side (upper side in the drawing) of each of the first insulator 211 and the second insulator 212 along the axial direction. This structure can suppress interference and contact of each wire 153 of the plurality of phase coils 152.

Each of the plurality of wire grooves 251 includes, for example, an outer section 2511 that is recessed from an outer surface of each of the first insulator 211 and the second insulator 212.

Each of the plurality of wire grooves 251 can include, for example, a side section 2512 extending from the outer section 2511 to a side surface of the wire guide 250.

In some implementations, the wire grooves 251 are formed in an upper wire guide 250 of the first insulator 211 and an upper wire guide 250 of the second insulator 212, respectively.

The first insulator 211 is provided with a power line connector 220 connecting the plurality of phase coils 152 to the three-phase AC power supply.

The second insulator 212 is provided with a neutral wire connector 240 that electrically connects the plurality of phase coils 152 at once.

The present disclosure illustrates an example in which the power line connector 220 is disposed on the first insulator 211 and the neutral wire connector 240 is disposed on the second insulator 212. However, this is merely illustrative, and the present disclosure may not be limited to this. Alternatively, the power line connector 220 can be disposed on the second insulator 212 and the power line connector 220 can be disposed on the first insulator 211.

The power line connector 220 is provided by three to correspond to each phase of the three-phase AC power supply.

The power line connectors 220 are disposed to correspond to the first tooth 12121, the second tooth 12122, and the third tooth 12123 of the first split core 121, respectively.

The power line connectors 220 protrude from the wire guide 250 in the axial direction.

Specifically, the power line connectors 220 include, for example, a U-phase power line connector 220U formed on one side of the first tooth 12121, a V-phase power line connector 220V formed on one side of the second tooth 12122, and a W-phase power line connector 220W formed on one side of the third tooth 12123.

The neutral wire connector 240, for example, can be disposed to correspond to the second tooth 12122 of the second split core 122.

The first insulator 211 includes phase coil connectors 230 that connect the plurality of phase coils 152 of the first split core 121 and the plurality of phase coils 152 of the second insulator 212 in series.

Each phase coil connector 230 can be disposed on one side of each power line connector 220.

Specifically, the phase coil connectors 230 include, for example, a U-phase coil connector 230U formed on one side of the first tooth 12121, a V-phase coil connector 230V formed on one side of the second tooth 12122, and a W-phase coil connector 230W formed on one side of the third tooth 12123.

The power line connector 220 includes a terminal 221 connected to the three-phase AC power supply, a terminal accommodating part 222 in which the terminal 221 is accommodated, and a slot 2221 in which the wire of the phase coil 152 is accommodated.

The terminal 221 includes, for example, a body 2211 made of a conductor, and a tab 2213 extending from the body 2211 in the axial direction.

The body 2211 is formed, for example, to have a cross-section in a U shape.

The body 2211 is inserted into the terminal accommodating part 222 so that its open side is disposed upward.

A slit 2212 is formed in the body 2211 so that the wire 153 of the phase coil 152 can be inserted.

The slit 2212 has an inner width smaller than a wire diameter of the wire 153 of the phase coil 152, for example.

Accordingly, when the wire 153 of the phase coil 152 is press-fitted into the slit 2212, the coated film 1532 of the wire 153 peels off the conductor 1531, so that the terminal 221 is brought into direct contact with the conductor 1531 of the wire 153 to be electrically connected.

The tab 2213 protrudes outward from the terminal accommodating part 222 along the axial direction.

The tab 2213 is connected to the three-phase AC power supply.

The terminal accommodating part 222 has a substantially rectangular parallelepiped shape.

An accommodation space that is open upward is defined in the terminal accommodating part 222.

A slot 2221 is formed by cutting downward the terminal accommodating part 222 in the axial direction.

The slot 2221 of the terminal accommodating part 222 can be provided by one pair, for example.

The slot 2221 of the terminal accommodating part 222 has a size (inner width) which is large enough to accommodate the wire 153 of the phase coil 152, for example.

The phase coil connector 230 includes, for example, a conductor 231, a conductor accommodating part 232 in which the conductor 231 is accommodated, and a slot 2321 in which the wire 153 of the phase coil 152 is accommodated.

The conductor 231 is formed, for example, to have a cross-section in a U shape.

A slit is formed by cutting the conductor 231 such that the wire 153 of the phase coil is press-fitted.

An accommodation space that is open upward is defined in the conductor accommodating part 232.

The conductor accommodating part 232 and the terminal accommodating part 222 are integrally formed with each other.

The slot 2321 that is cut along the axial direction is disposed in the conductor accommodating part 232.

The slot 2321 of the conductor accommodating part 232 can be provided by one pair, for example.

The slot 2321 of the phase coil connector 230 is formed such that the wire 153 of the phase coil 152 can be accommodated therein.

The neutral wire connector 240 includes, for example, a conductor 241, a conductor accommodating part 242 in which the conductor 241 is accommodated, and a slot 2421 in which the wire 153 of the phase coil 152 is accommodated.

The conductor 241 is formed, for example, to have a cross-section in a U shape.

The conductor 241 includes a plurality of slits 2411 in which the three phase coils 152 (U-phase coil 152U, V-phase coil 152V, and W-phase coil 152W) can be inserted (press-fitted), respectively.

The conductor 241 is, for example, formed to have a length longer than its height.

The conductor accommodating part 242 is formed to be open upward such that the conductor 241 can be accommodated therein along the axial direction, for example.

The conductor accommodating part 242 includes a plurality of slots 2421 in which the wires 153 of the three phase coils 152 (U-phase coil 152U, V-phase coil 152V, and W-phase coil 152W) can be accommodated, respectively.

The plurality of slots 2421 can be, for example, 3 pairs.

Figure 7:
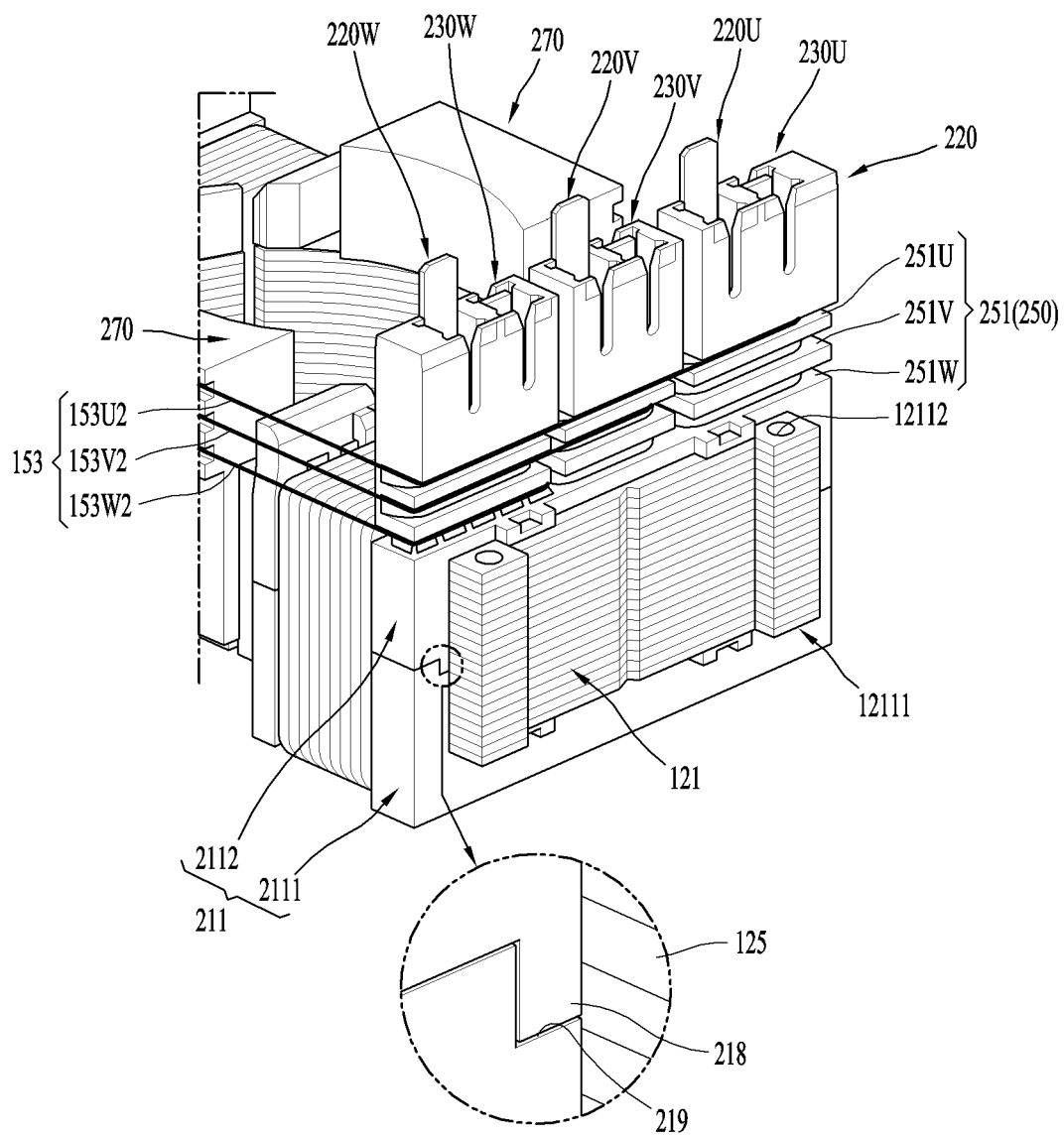
FIG. 7 is an enlarged view illustrating an example of a power line connector and a phase coil connector of the stator of the motor of FIG. 1.
Figure 8:
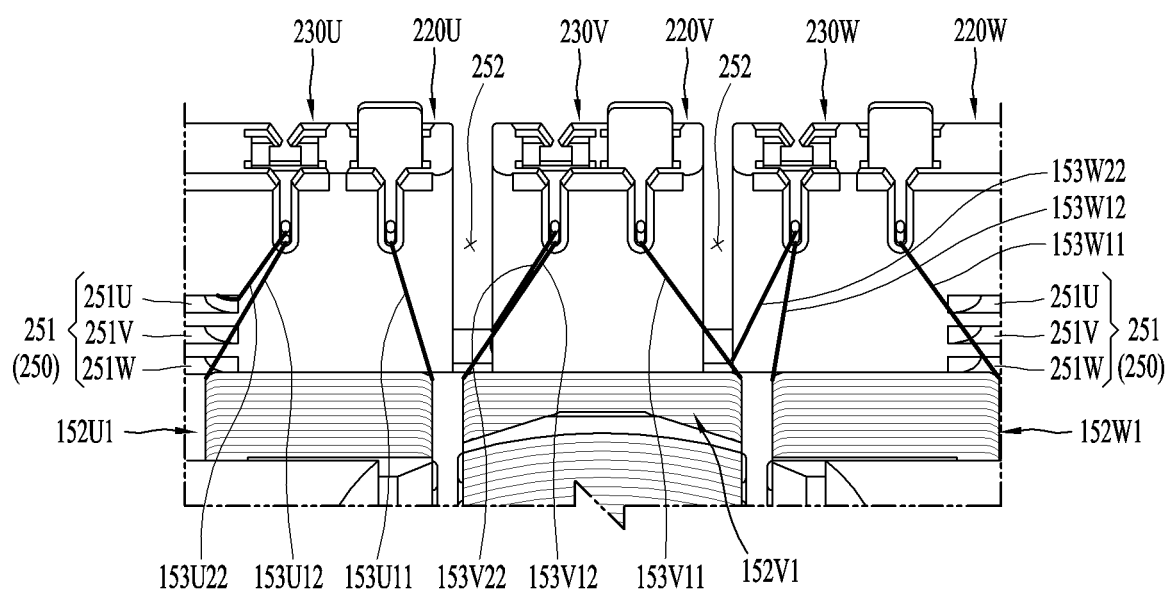
FIG. 8 is an enlarged view illustrating an example of an inside of the power line connector and the phase coil connector of the stator of the motor of FIG. 1.

FIG. 7 is an enlarged view illustrating the power line connector and the phase coil connector of the stator of the motor of FIG. 1, and FIG. 8 is an enlarged view illustrating an inside of the power line connector and the phase coil connector of the stator of the motor of FIG. 1. As illustrated in FIGS. 1 to 3 and 7, the wire guide 250 is provided on one side (lower side in the drawing) of the power line connector 220 and the phase coil connector 230.

A plurality of wire grooves 251, in which the wires 153 of the plurality of phase coils 152 (U-phase coil 152U, V-phase coil 152V, and W-phase coil 152W) are separately accommodated, are disposed below the power line connectors 220 and the phase coil connectors 230, respectively.

In some implementations, the plurality of wire grooves 251 include, for example, a W-phase wire groove 251W disposed in an area close to the first split core 121 in the axial direction, a V-phase wire groove 251V disposed above the W-phase wire groove 251W, and a U-phase wire groove 251U disposed above the V-phase wire groove 251V.

As illustrated in FIG. 8, one end portion 153U11 (right end portion in the drawing) of the wire 153 of the first U-phase coil 152U1 can be inserted into the slot 2221 of the power line connector 220. Accordingly, the first U-phase coil 152U1 is electrically connected to the terminal 221.

Another end portion 153U12 (left end portion in the drawing) of the wire 153 of the first U-phase coil 152U1 can be inserted into the slot 2321 of the U-phase coil connector 230U.

Another end portion 153U22 of the second U-phase coil 152U2 drawn out from the U-phase wire groove 251U is inserted into the slot 2321 of the U-phase coil connector 230U.

The another end portion 153U12 of the first U-phase coil 152U1 and the another end portion 153U22 of the second U-phase coil 152U2 are inserted into the slit 2311 of the conductor 231 of the U-phase coil connector 230U, such that the first U-phase coil 152U1 and the second U-phase coil 152U2 are electrically connected (serial connection).

One end portion 153V11 (right end portion in the drawing) of the first V-phase coil 152V1 is inserted into the slot 2221 of the V-phase power line connector 220V.

Another end portion 153V12 (left end portion in the drawing) of the first V-phase coil 152V1 is inserted into the slot 2321 of the V-phase coil connector 230V.

Another end portion 153V22 of the second V-phase coil 152V2 drawn out from the V-phase wire groove 251V is inserted into the slot 2321 of the V-phase coil connector 230V.

Accordingly, the first V-phase coil 152V1 and the second V-phase coil 152V2 are connected in series.

One end portion 153W11 (right end portion in the drawing) of the wire 153 of the first W-phase coil 152W1 is inserted into the slot 2221 of the W-phase power line connector 220W. Accordingly, the first W-phase coil 152W1 is electrically connected to the terminal 221.

Another end portion 153W12 (left end portion in the drawing) of the wire 153 of the first W-phase coil 152W1 is inserted into the slot 2321 of the W-phase coil connector 230W.

Another end portion 153W22 of the wire 153 of the second W-phase coil 152W2 drawn out from the W-phase wire groove 251W is inserted into the slot 2321 of the W-phase coil connector 230W.

Accordingly, the first W-phase coil 152W1 and the second W-phase coil 152W2 are connected in series.

Figure 9:
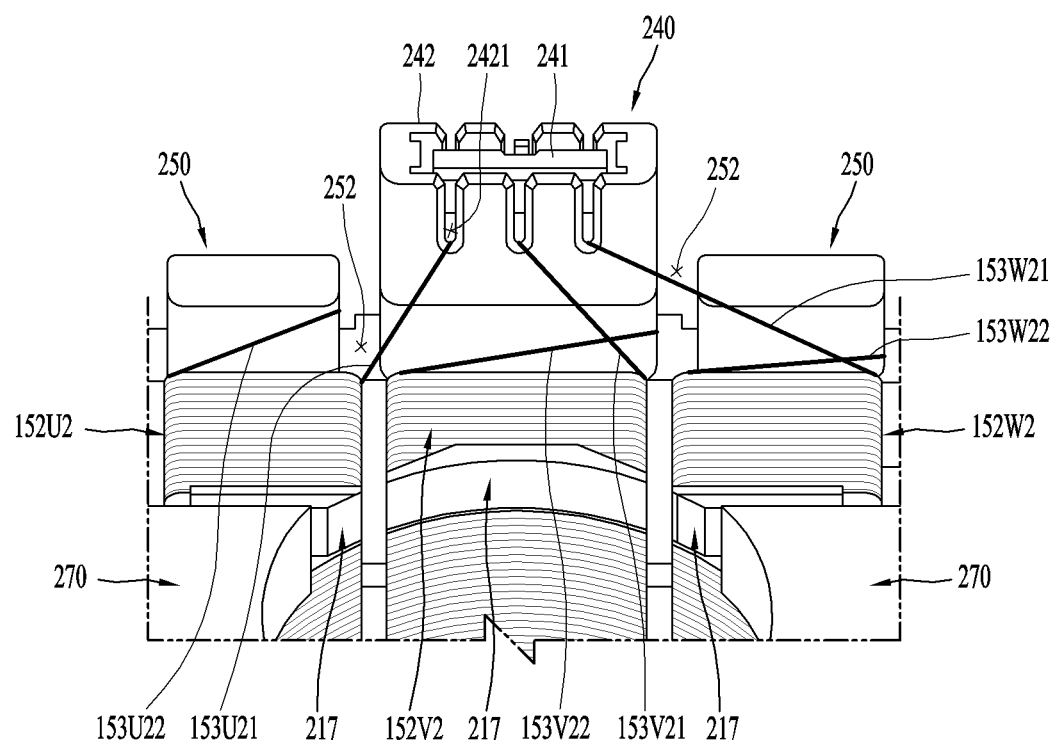
FIG. 9 is an enlarged view illustrating an example of a neutral line connector of the stator of the motor of FIG. 2.
Figure 10:
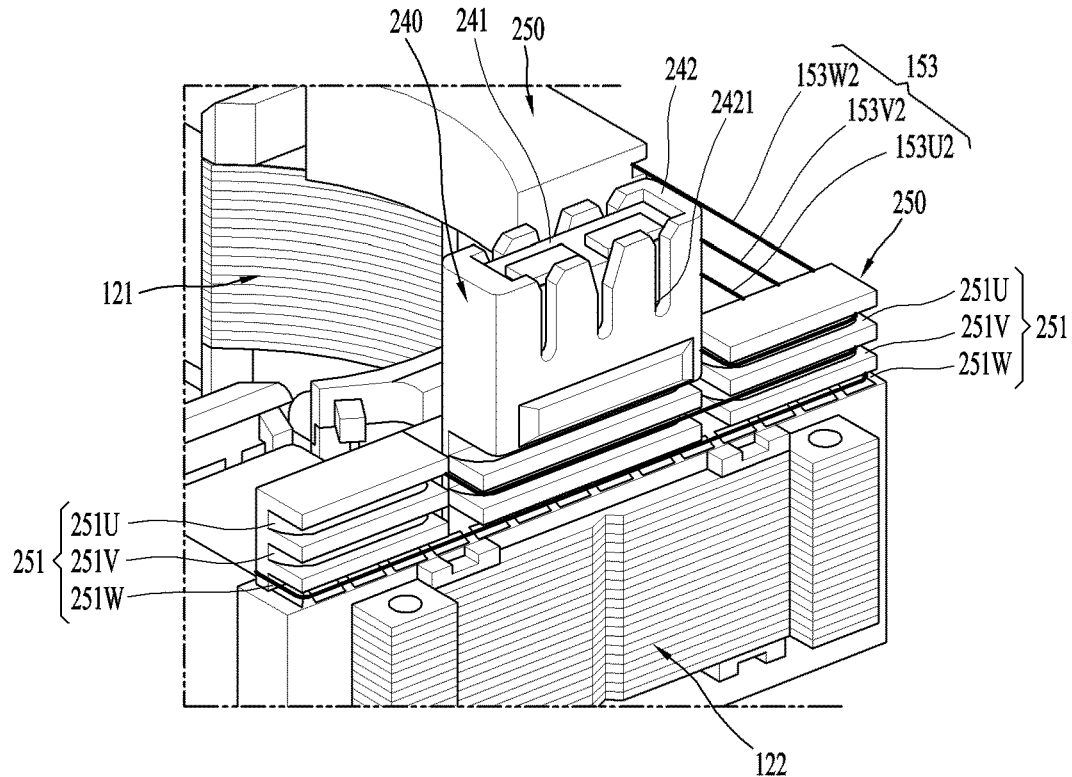
FIG. 10 is an enlarged view illustrating an example of a neutral line connector of the stator of the motor of FIG. 1.

FIG. 9 is an enlarged view illustrating a neutral line connector area of the stator of the motor of FIG. 2, and FIG. 10 is an enlarged view illustrating a neutral line connector of the stator of the motor of FIG. 1. As illustrated in FIG. 9, one end portion (right end portion in the drawing) of the second U-phase coil 152U2 is inserted into one slot 2421 (left slot in the drawing) of the neutral wire connector 240.

Another end portion (left end portion in the drawing) of the second U-phase coil 152U2 extends into the U-phase wire groove 251U of the wire guide 250, passes through the connection member 270 after extending along the U-phase wire groove 251U as illustrated in FIG. 10, and is then inserted into the slot 2321 of the U-phase coil connector 230U, as illustrated in FIG. 8.

One end portion (right end portion in the drawing) of the wire 153 of the second V-phase coil (152V2) is inserted into another slot (middle slot in the drawing) of the neutral wire connector 240.

Another end portion (left end portion in the drawing) of the wire 153 of the second V-phase coil 152V2 extends into the V-phase wire groove 251V of the wire guide 250 below the neutral wire connector 240, passes through the connection member 270 as illustrated in FIG. 10, and is then inserted into the slot 2321 of the V-phase coil connector 230V as illustrated in FIG. 8.

One end portion (right end portion in the drawing) of the wire 153 of the second W-phase coil 152W2 is inserted into the other slot (right slot in the drawing) of the neutral wire connector 240.

Another end portion (left end portion in the drawing) of the wire 153 of the second W-phase coil 152W2 extends into the W-phase wire groove 251W of the wire guide 250 (right wire guide 250 in the drawing), passes through the connection member 270 after moving along the circumferential direction as illustrated in FIG. 10, and is then inserted into the slot 2321 of the W-phase coil connector 230W as illustrated in FIG. 8.

Figure 11:
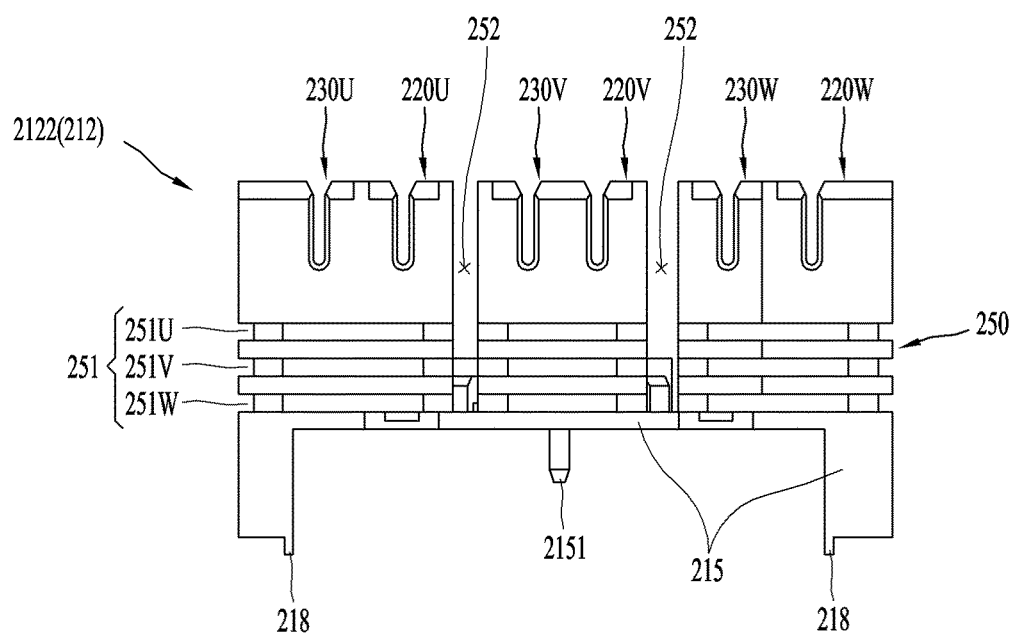
FIG. 11 is a lateral view illustrating an example of a first upper insulator of the stator of the motor of FIG. 1.

FIG. 11 is a lateral view illustrating a first upper insulator of the stator of the motor of FIG. 1. As illustrated in FIG. 11, the first upper insulator 2112 includes a yoke insulating part 215 that surrounds and insulates upper and side surfaces of the yoke 1211 of the first split core 121.

Overlap parts 218 are disposed on a lower end of the yoke insulating part 215 to overlap the first lower insulator 2111.

Correspondingly, the first lower insulator 2111 is provided with recess parts 219 that are recessed to correspond to the shape of the overlap parts 218 (see FIG. 7).

The overlap parts 218 of the first upper insulator 2112 are inserted into the recess parts 219 of the first lower insulator 2111.

A guide pin 2151 protrudes downward from a lower side of a center of the yoke insulating part 215.

The guide pin 2151 is inserted into the guide pin hole 12113 of the first split core 121.

The wire guide 250 is disposed on the upper side of the yoke insulating part 215 of the first upper insulator 2112.

The wire guide 250 protrudes upward from the yoke insulating part 215 in the axial direction.

The wire guide 250 is provided with draw-out grooves 252 through which the wires 153 of the plurality of phase coils 152 can be drawn out.

The draw-out grooves 252 correspond to a boundary region between the first U-phase coil 152U1 and the first V-phase coil 152V1 and a boundary region between the first V-phase coil 152V1 and the first W-phase coil 152W1, respectively.

Figure 12:
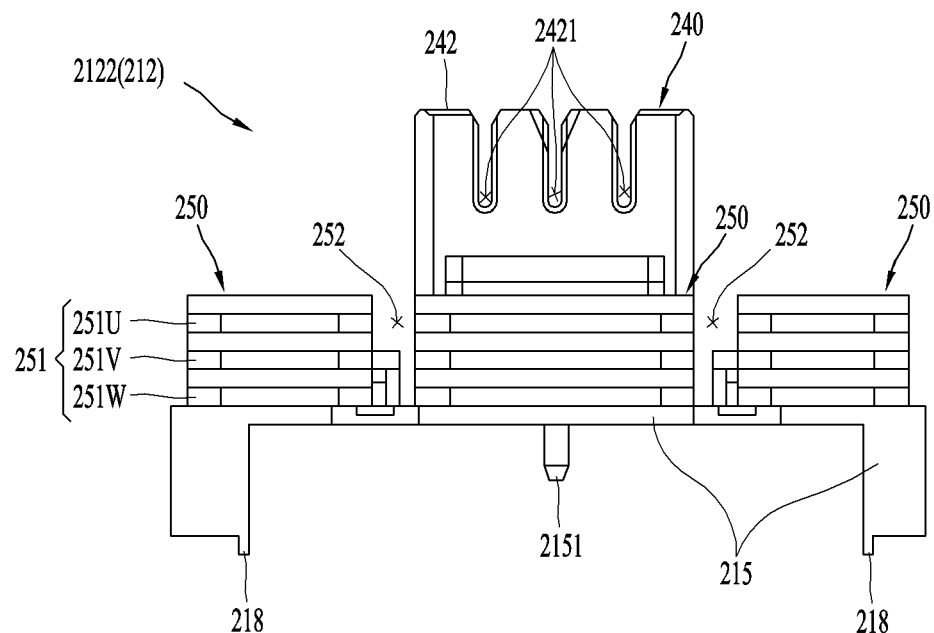
FIG. 12 is a lateral view illustrating an example of a second upper insulator of the stator of the motor of FIG. 1.

FIG. 12 is a lateral view illustrating a second upper insulator of the stator of the motor of FIG. 1. As illustrated in FIG. 12, the second upper insulator 2122 includes a yoke insulating part 215 that surrounds and insulates upper and side surfaces of the yoke 1211 of the second split core 122.

Overlap parts 218 are disposed on lower ends of both sides of the yoke insulating part 215 to overlap the second lower insulator 2121.

A guide pin 2151 protrudes downward from a lower side of a center of the yoke insulating part 215.

The guide pin 2151 is inserted into and coupled to the guide pin hole 12113 of the second split core 122.

The wire guide 250 is disposed on the upper side of the yoke insulating part 215 of the second upper insulator 2122.

The wire guide 250 has a plurality of wire grooves 251 to separately accommodate the wires 153 of the plurality of phase coils 152.

The plurality of wire grooves 251 include, for example, a W-phase wire groove 251W disposed close to the yoke insulating part 215 in the axial direction, a V-phase wire groove 251V disposed above the W-phase wire groove 251W, and a U-phase wire groove 251U disposed above the V-phase wire groove 251V.

The wire guide 250 is provided with draw-out grooves 252 formed by cutting the wire guide 250 in the axial direction. Accordingly, the wires 153 of the plurality of phase coils 152 can be drawn out through the draw-out grooves 252.

The draw-out grooves are formed in a boundary region between the second U-phase coil 152U2 and the second V-phase coil 152V2 and a boundary region between the second V-phase coil 152V2 and the second W-phase coil 152W2, respectively.

The neutral wire connector 240 protrudes from a central region of the wire guide 250 in the axial direction.

Figure 13:
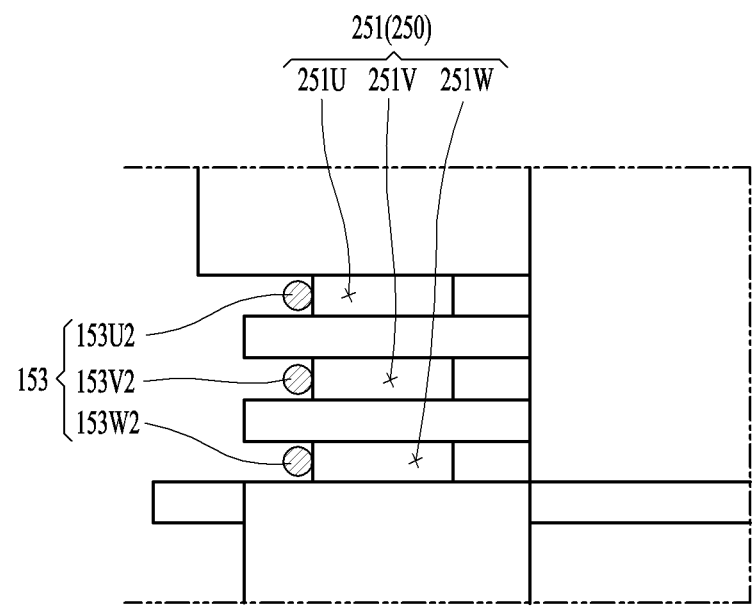
FIG. 13 is an enlarged view illustrating an example of a wire groove of FIG. 1.

FIG. 13 is an enlarged view illustrating a wire groove of FIG. 1. As illustrated in FIG. 13, the wire grooves 251 include a W-phase wire groove 251W disposed on a lower side along the axial direction, a V-phase wire groove 251V disposed above the W-phase wire groove, and a U-phase wire groove 251U disposed above the V-phase wire groove 251V.

The wire grooves 251 are spaced apart from one another at a preset distance.

Here, the preset distance can be set equal to or longer than an insulation distance between the wires 153 of the plurality of phase coils 152.

This can suppress an occurrence of an electric discharge between the wires 153 of the plurality of phase coils 152.

In some implementations, the wire grooves 251 (U-phase wire groove 251U, V-phase wire groove 251V, and W-phase wire groove 251W) are formed 1.1 times or more of the wire diameter of the wires 153 U-phase wire 153U2, V-phase wire 153V2, and W-phase wire 153W2) of the plurality of phase coils 152.

This enables a common use of an insulator of a stator of a motor having a different rated capacity.

This configuration can facilitate manufacture and management of the first insulator 211 and the second insulator 212.

Figure 14:
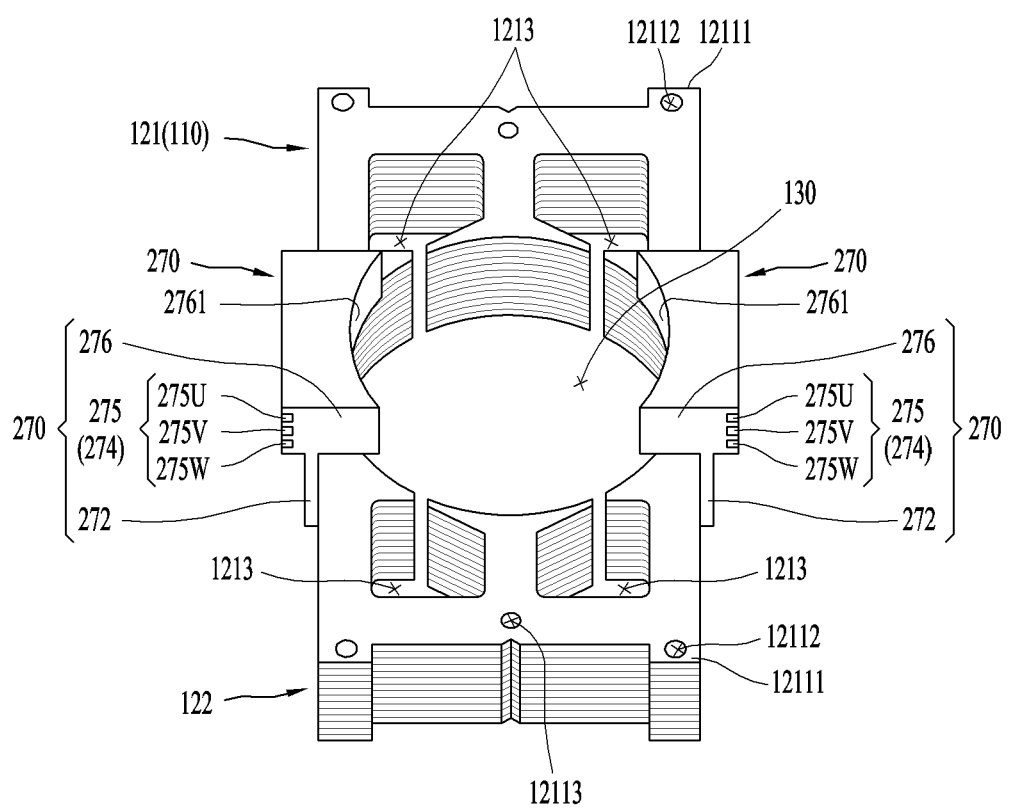
FIG. 14 is a perspective view illustrating an example of a coupled state between split cores and a connection member of FIG. 1.
Figure 15:
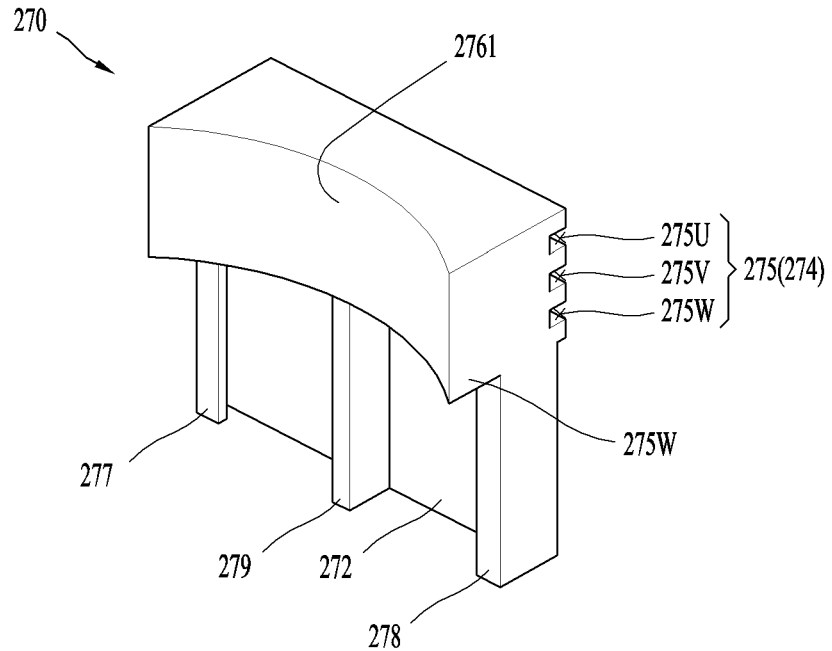
FIG. 15 is a perspective view illustrating the connection member of FIG. 14.
Figure 16:
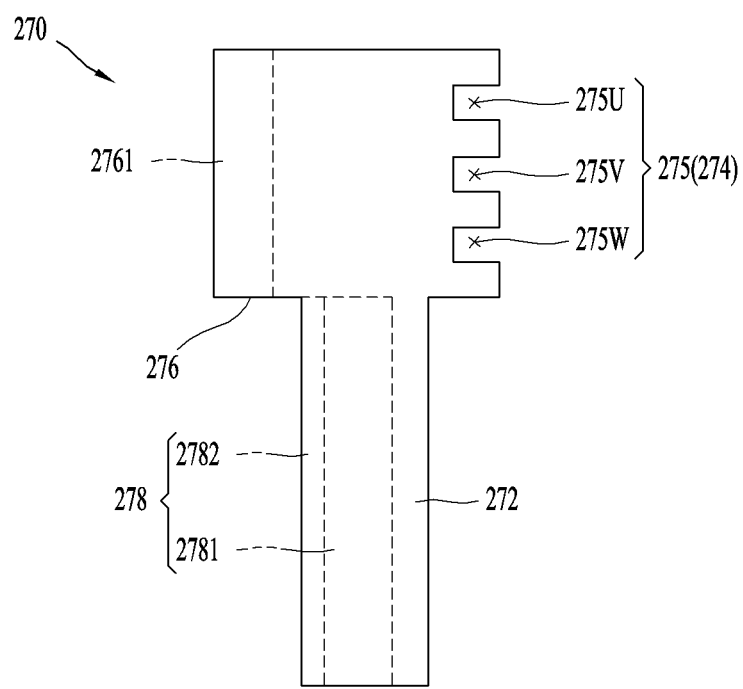
FIG. 16 is a lateral view illustrating the connection member of FIG. 15.
Figure 17:
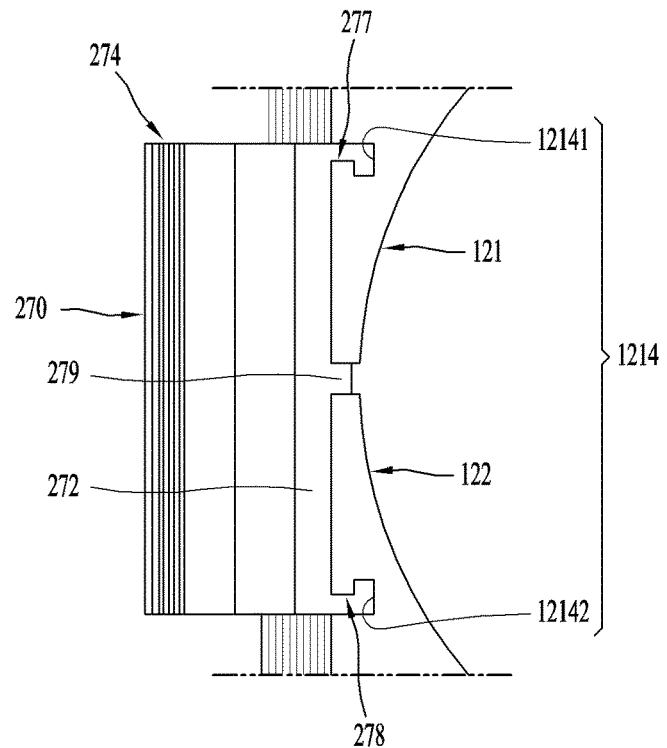
FIG. 17 is a bottom perspective view illustrating an example of a wire guide side of the connection member of FIG. 14.
Figure 18:
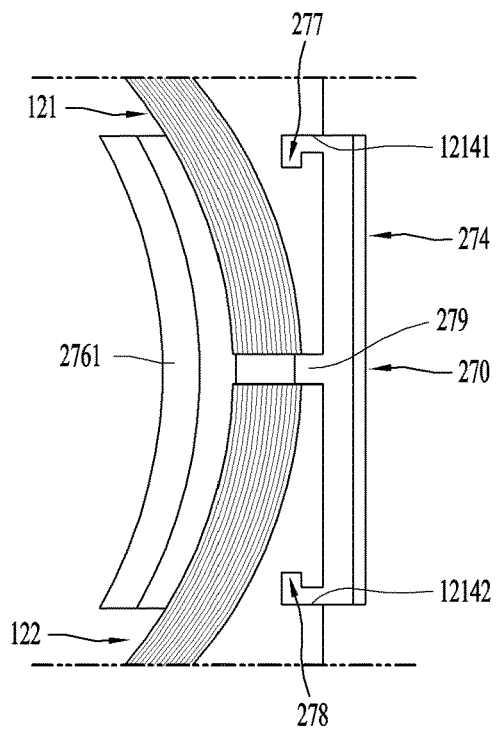
FIG. 18 is a bottom perspective view illustrating an example of a protrusion side of the connection member of FIG. 14.

FIG. 14 is a perspective view illustrating a coupled state between split cores and a connection member of FIG. 1, FIG. 15 is a perspective view illustrating the connection member of FIG. 14, FIG. 16 is a lateral view illustrating the connection member of FIG. 15, FIG. 17 is a bottom perspective view illustrating a wire guide side of the connection member of FIG. 14, and FIG. 18 is a bottom perspective view illustrating a protrusion side of the connection member of FIG. 14. As illustrated in FIGS. 4, 14, and 15, the first split core 121 and the second split core 122 are connected by the connection members 270.

The connection member 270 is formed of an insulating material.

Each of the connection members 270 includes a body 272 disposed on side surfaces of the first split core 121 and the second split core 122, a first coupling part coupled to the first split core 121, and a second coupling part 278 coupled to the second split core 122.

The connection members 270 are disposed on both sides of the first split core 121 and the second split core 122, respectively.

The first coupling part 277 and the second coupling part 278 include, respectively, protruding portions 2771 and 2781 protruding from the body 272 to be inserted into the first split core 121 and the second split core 122, and bent end portions 2772 and 2782 perpendicularly bent from the protruding portions 2771 and 2781.

The first split core 121 and the second split core 122 have a first coupling groove 12141 and a second coupling groove 12142, respectively, through which the first coupling part 277 and the second coupling part 278 can be respectively inserted.

Here, the first coupling part 277 and the second coupling part 278 of the connection member 270 are configured to be inserted into the first coupling groove 12141 and the second coupling groove 12142, respectively, along the axial direction.

The body 272 is formed, for example, in a rectangular plate shape.

The first coupling part 277 and the second coupling part 278 are respectively disposed on both end portions of the body 272 in the longitudinal direction.

The connection member 270 includes a spacer 279 inserted between the first split core 121 and the second split core 122.

The spacer 279 is inserted between end portions of the tooth 1212 of the first split core 121 and the tooth 1212 of the second split core 122, so as to maintain a space or gap between the tooth of the first split core 121 1212 and the tooth 1212 of the second split core 122.

Accordingly, leakage of magnetic flux formed by the plurality of phase coils 152 can be suppressed during the operation of the motor.

In some implementations, a connection wire guide 274 is disposed in one side (upper side in the drawing) of the body 272.

A U-phase wire groove 275U, a V-phase wire groove 275V, and a W-phase wire groove 275W, in which the wires 153 of the plurality of phase coils 152 (the second U-phase coil 152U2, the second V-phase coil 152V2, and the second W-phase coil 152W2) are separately accommodated, are formed in an outer surface of the wire guide 274 of the connection member 270.

As illustrated in FIGS. 15 to 17, the wire guide 274 of the connection member 270 is configured to protrude outward, compared to the body 272.

Here, the wire guide 274 of the connection member 270 protrudes outward to be spaced apart from the plurality of phase coils 152 to suppress a contact or partial electric discharge between the wires 153, which are drawn out from the plurality of phase coils 152 and accommodated in the plurality of guide grooves 275.

The connection member 270 is provided with a protrusion 276 protruding toward the rotor accommodating hole 130 inside the wire guide 274.

The protrusion 276 has an inner surface 2761 having an arcuate shape.

As illustrated in FIG. 18, the protrusion 276 of the connection member 270 protrudes more toward the center of the rotor accommodating hole 130 compared to the inner surfaces of the tooth 1212 of the first split core 121 and the tooth 1212 of the second split core 122 that define the rotor accommodating hole 130.

The protrusion 276 of the connection member 270 is disposed above the rotor accommodating hole 130.

Accordingly, when the stator and the rotor of the motor are coupled, an upper side of an air gap formed between the stator core and the rotor can be blocked by the protrusion 276.

Figure 19:
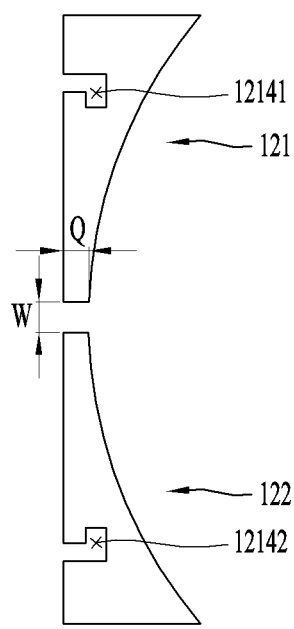
FIG. 19 is a view illustrating spaced distances between first and second coupling grooves and first and second split cores of FIG. 17.
Figure 20:
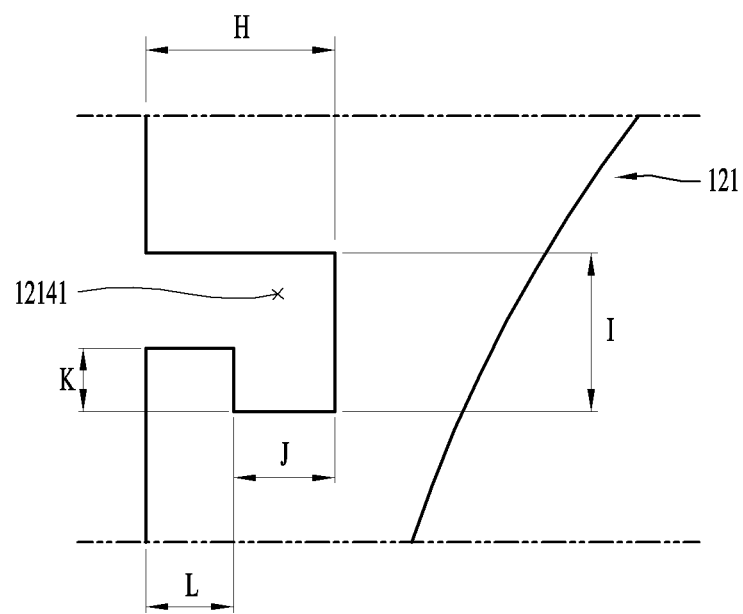
FIG. 20 is an enlarged view illustrating an example of a first coupling part of FIG. 17.
Figure 21:
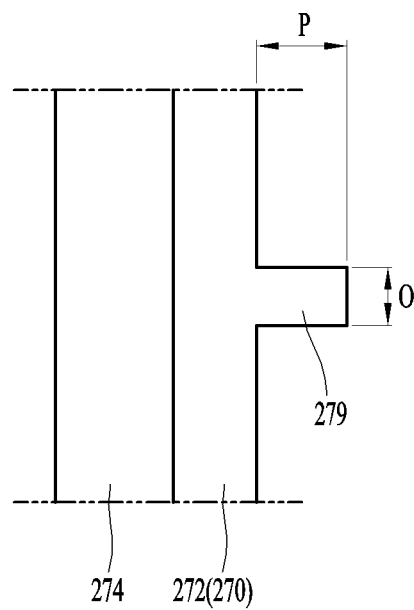
FIG. 21 is an enlarged view illustrating the first coupling groove of FIG. 19.
Figure 22:
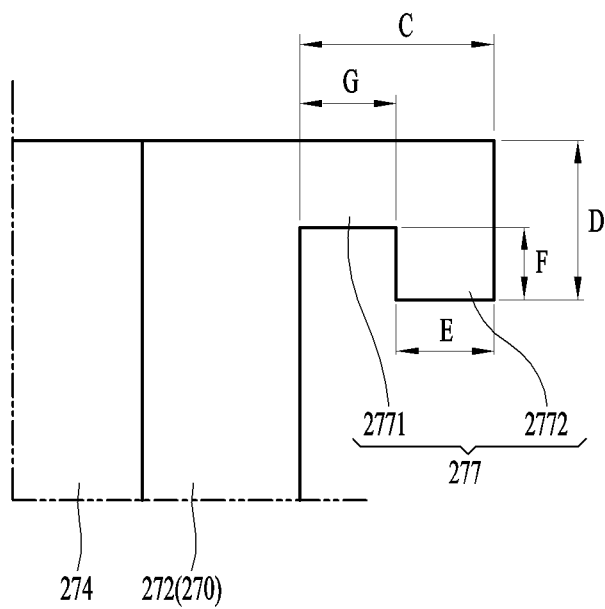
FIG. 22 is an enlarged view illustrating an example of a spacer of FIG. 17.

FIG. 19 is a view illustrating separation distances between first and second coupling grooves and the first and second split cores of FIG. 17, FIG. 20 is an enlarged view illustrating a first coupling part of FIG. 17, FIG. 21 is an enlarged view illustrating the first coupling groove of FIG. 19, and FIG. 22 is an enlarged view illustrating a spacing keeping part of FIG. 17. As illustrated in FIG. 19, the first split core 121 and the second split core 122 are spaced apart from each other by at a preset distance W.

An end portion of the first tooth 12121 of the first split core 121 and an end portion of the third tooth 12123 of the second split core 122 are spaced apart from each other by the distance W.

Similarly, an end portion of the third tooth 12123 of the first split core 121 and an end portion of the first tooth 12121 of the second split core 122 are spaced apart from each other by the distance W.

The end portion of the first tooth 12121 of the first split core 121 and the end portion of the third tooth 12123 of the second split core 122 are configured to have a preset thickness Q along the radial direction.

In some implementations, the first coupling groove 12141 of the first split core 121 and the second coupling groove 12142 of the second split core 122 have the same shape and measurements, and the first coupling part 277 and the second coupling part 278 of the connection member 270 have the same shape and measurements. Therefore, the first coupling groove 12141 and the first coupling part 277 will be exemplarily described.

As illustrated in FIG. 20, the first coupling part 277 includes a protrusion 2771 protruding from the body 272 of the connection member 270, and a bent end portion 2772 perpendicularly bent from an end portion of the protrusion 2771.

As illustrated in FIG. 21, the first coupling groove 12141 penetrates through the first split core 121 in the axial direction to correspond to the first coupling part 277 so that the first coupling part 277 can be inserted along the axial direction.

In some implementations, a length D from an outer surface of the protrusion 2771 to an end of the bent end portion 2772 of the first coupling part 277, a thickness E of the bent end portion 2772, and a length F from an inner surface of the protrusion 2771 to the end of the bent end portion 2772 can be equal to or slightly greater than a first inner width I, a second inner width J, and a third inner width K of the first coupling groove 12141.

Accordingly, the first coupling part 277 can be fitted to the inside of the first coupling groove 12141 in a transition-fitting or interference-fitting manner.

In some examples, a length C from the body 272 to the outer surface of the bent end portion 2772 and a length G from the body 272 to the inner surface of the bent end portion 2772 can be equal to or smaller than 0.995 times of a fourth inner width H and a fifth inner width L of the first coupling groove 12141.

In some examples, as illustrated in FIG. 22, the spacer 279 having preset length P and thickness O is disposed on the body 272 of the connection member 270.

In some implementations, the thickness O of the spacer 279 can be 0.4 mm or more. This can facilitate injection-molding of the spacer 279. In some examples, the length P of the spacer 279 can be equal to or smaller than 0.98 times the thickness Q of the teeth 1212 of the first split core 121 and the second split core 122.

This can suppress the spacer 279 from protruding into the rotor accommodating hole 130.

With this configuration, when assembling the stator of the motor, after aligning the teeth 1212 of the first split core 121 and the second split core 122 to face each other, the end portions of the teeth 1212 are made to be spaced apart from each other by the preset distance.

The connection members 270 are disposed on the upper side of the side surfaces of the first split core 121 and the second split core 122, and the first coupling part 277 and the second coupling part 278 of each of the connection members 270 are coupled to the first coupling groove 12141 and the second coupling groove 12142 of the first split core 121 and the second split core 122 along the axial direction, respectively.

The first insulator 211 is coupled to the first split core 121 and the second insulator 212 is coupled to the second split core 122.

The first U-phase coil 152U1, the first V-phase coil 152V1, and the first W-phase coil 152W1 are wound around the first tooth 12121 to the third tooth 12123 of the first split core 121, and the second U-phase coil 152U2, the second V-phase coil 152V2, and the second W-phase coil 152W2 are wound around the first tooth 12121 to the third tooth 12123 of the second split core 122, respectively, by a preset number of turns.

Each end portion (e.g., right end portion in the drawing) of the first U-phase coil 152U1, the first V-phase coil 152V1, and the first W-phase coil 152W1 is inserted into the corresponding slot 2221 of each of the power line connectors 220, and the corresponding terminals 221 are inserted into the terminal accommodating parts 222. Accordingly, the first U-phase coil 152U1, the first V-phase coil 152V1, and the first W-phase coil 152W1 are electrically connected with the corresponding terminals 221.

Another end portions (e.g., left end portions in the drawing) of the first U-phase coil 152U1, the first V-phase coil 152V1, and the first W-phase coil 152W1 are inserted into the slots 2321 of the corresponding phase coil connectors 230, respectively.

Each end portion (e.g., right end portion in the drawing) of the second U-phase coil 152U2, the second V-phase coil 152V2, and the second W-phase coil 152W2 is inserted into the slot 2421 of the neutral wire connector 240, and the conductor 241 is inserted into the conductor accommodating part 242. Accordingly, the second U-phase coil 152U2, the second V-phase coil 152V2, and the second W-phase coil 152W2 are electrically connected (in a Y-shape) to one another by the conductor 241 of the neutral wire connector 240.

Another end portions (e.g., left end portions in the drawing) of the second U-phase coil 152U2, the second V-phase coil 152V2, and the second W-phase coil 152W2 are accommodated in the wire grooves 251 of the wire guide 250, and then inserted into the slots 2321 of the phase coil connectors 230 of the first insulator 211 via the wire guides 274 of the connection member 270.

When the corresponding conductors 231 are inserted into the phase coil connectors 230, respectively, the another end portions of the first U-phase coil 152U1, the first V-phase coil 152V1, and the first W-phase coil 152W1 and the another end portions of the second U-phase coil 152U2, the second V-phase coil 152V2, and the second W-phase coil 152W2 are simultaneously coupled to the corresponding conductors 231, so that the first U-phase coil 152U1, the first V-phase coil 152V1, and the first W-phase coil 152W1 and the second U-phase coil 152U2, the second V-phase coil 152V2, and the second W-phase coil 152W2 are connected in series for each phase.

As described above, in the stator of the motor according to the present disclosure, a wiring process can be shortened by merely performing processes of accommodating the wires of the plurality of phase coils 152 in the wire grooves 251, inserting the wires into the corresponding slots of the power line connectors 220, the phase coil connectors 230, and the neutral wire connector 240, and coupling the corresponding conductors (or terminals 221), without performing a neutral wire protection tube insertion process, a lead wire arrangement process, a lead wire tube insertion process, a soldering process, an insulation tube insertion process, a neutral wire bundling process, and a housing insertion process which are performed for the related art stator of a motor.

In some examples, where the stator of the motor does not use separate wiring components (e.g., busbar, wiring PCB, insulation tube, connection conductor, etc.) when wiring the stator coil, the number of components and the number of assembly processes can be significantly reduced.

In some examples, where a welding or soldering process is not performed to connect the conductors, the wiring of the stator coil can be carried out quickly and easily.

Since the wires of the plurality of phase coils 152 are separately accommodated in the different wire grooves 251, unnecessary interference between the wires does not occur, and partial discharge between the wires can be suppressed.

The foregoing description has been given of specific embodiments of the present disclosure. However, since the present disclosure can be embodied in various forms without departing from the essential characteristics, the embodiments described above should not be limited by the specific contents for carrying out the disclosure.

In addition, even implementations not listed in the foregoing detailed description should be broadly construed within the scope of the technical idea defined in the appended claims. And, all changes and modifications included within the technical range of the claims and their equivalents should be embraced by the appended claims.

What is claimed is:

1. A stator of a motor, the stator comprising:
    a first split core comprising a plurality of first teeth;
    a second split core comprising a plurality of second teeth, the second split core facing the first split core and defining a rotor accommodating hole with the first split core;
    a first insulator disposed at the first split core;
    a second insulator disposed at the second split core;
    a plurality of phase coils that are wound around the plurality of first teeth and the plurality of second teeth, respectively, the plurality of phase coils being configured to connect to a three-phase alternating current (AC) power supply;
    a plurality of power line connectors that are disposed at the first insulator and configured to connect the plurality of phase coils to the three-phase AC power supply; and
    a neutral line connector that is disposed at the second insulator and connected to the plurality of phase coils,
    wherein the first insulator comprises a first wire guide configured to guide the plurality of phase coils, and
    wherein the second insulator comprises a second wire guide configured to guide the plurality of phase coils.

2. The stator of claim 1, wherein the plurality of power line connectors are disposed at one side of the plurality of first teeth and face the plurality of first teeth in an axial direction of the stator, respectively,
    wherein the plurality of phase coils comprise (i) first phase coils that are wound around the plurality of first teeth and (ii) second phase coils that are wound around the plurality of second teeth, and
    wherein the stator further comprises a plurality of phase coil connectors that are disposed at a side of the plurality of power line connectors, the plurality of phase coil connectors connecting the first phase coils and the second phase coils electrically in series, respectively.

3. The stator of claim 2, wherein the first phase coils are arranged in a phase order defined along a circumferential direction of the rotor accommodating hole, and
    wherein the second phase coils are arranged in the phase order along the circumferential direction.

4. The stator of claim 1, wherein the first wire guide is spaced apart from the first split core in an axial direction of the stator, and the second wire guide is spaced apart from the second split core in the axial direction,
    wherein the plurality of power line connectors protrude from the first wire guide in the axial direction, and
    wherein the neutral line connector protrudes from the second wire guide in the axial direction.

5. The stator of claim 4, wherein each of the first wire guide and the second wire guide defines wire grooves that accommodate the plurality of phase coils, respectively, and separate the plurality of phase coils from one another.

6. The stator of claim 5, wherein the wire grooves are spaced apart from one another by a preset distance in the axial direction.

7. The stator of claim 5, wherein a width of one of the wire grooves is 1.1 times or more of a wire diameter of one of the plurality of phase coils.

8. The stator of claim 5, wherein each of the plurality of power line connectors comprises:
    a terminal configured to connect to the three-phase AC power supply;
    a terminal accommodating part that protrudes from the first wire guide and accommodates the terminal; and
    a first slot that accommodates one or more of the plurality of phase coils.

9. The stator of claim 8, wherein the stator further comprises a plurality of phase coil connectors, each of the plurality of phase coil connectors comprising:
    a conductor;
    a conductor accommodating part that protrudes from the first wire guide and accommodates the conductor; and
    a second slot that accommodates one or more of the plurality of phase coils.

10. The stator of claim 9, wherein the first slot is defined between inner surfaces of each of the plurality of power line connectors, and
    wherein the second slot is defined between inner surfaces of each of the plurality of phase coil connectors.

11. The stator of claim 10, wherein the first slot and the second slot are cut portions recessed by preset lengths in the axial direction.

12. The stator of claim 11, wherein each of the wire grooves has:
    an outer section that is recessed inward from an outer surface of a corresponding wire guide among the first wire guide and the second wire guide; and
    a side section that laterally extends from the outer section to a side surface of the corresponding wire guide.

13. The stator of claim 5, wherein the neutral line connector comprises:
    a conductor;
    a conductor accommodating part that protrudes from the second wire guide in the axial direction and accommodates the conductor; and
    a slot that accommodates one of the plurality of phase coils.

14. The stator of claim 1, wherein the first split core further comprises a first yoke, and the plurality of first teeth are three teeth that protrude from the first yoke and extend parallel to one another, and
    wherein the second split core further comprises a second yoke, and the plurality of second teeth are three teeth that protrude from the second yoke and extend parallel to one another.

15. The stator of claim 1, further comprising connection members that are made of an insulating material and connect the first split core and the second split core to each other.

16. The stator of claim 15, wherein each of the connection members comprises:

a body that faces side surfaces of the first split core and the second split core;
a first coupling part disposed at a first end portion of the body and coupled to the first split core along an axial direction of the stator; and
a second coupling part disposed at a second end portion of the body and coupled to the second split core along the axial direction.

17. The stator of claim 16, wherein the first coupling part comprises:
   a first protrusion that protrudes from the body and is inserted into the first split core; and
   a first bent end portion that is curved from an end of the first protrusion, and
   wherein the second coupling part comprises:
      a second protrusion that protrudes from the body and is inserted into the second split core, and
      a second bent end portion that is curved from an end of the second protrusion.

18. The stator of claim 15, wherein each of the connection members further comprises a spacer that is disposed between the first split core and the second split core and configured to maintain a distance between the first split core and the second split core.

19. The stator of claim 15, wherein each of the connection members comprises a connection wire guide configured to guide the plurality of phase coils,
   wherein the connection wire guide defines a plurality of connection wire grooves that separately accommodate the plurality of phase coils and extend parallel to the wire grooves of the first insulator and the second insulator.

20. The stator of claim 1, wherein each of the first wire guide and the second wire guide defines wire grooves that accommodate the plurality of phase coils, respectively, and separate the plurality of phase coils from one another.

* * * * *